(12) United States Patent
Kelsey

(10) Patent No.: US 9,233,520 B2
(45) Date of Patent: Jan. 12, 2016

(54) LAMINATED ARTICLES HAVING DISCONTINUOUS ADHESIVE REGIONS

(71) Applicant: W. L. Gore & Associates, Inc., Newark, DE (US)

(72) Inventor: William Kelsey, Elkton, MD (US)

(73) Assignee: W. L. Gore & Associates, Inc., Newark, DE (US)

( * ) Notice: Subject to any disclaimer, the term of this patent is extended or adjusted under 35 U.S.C. 154(b) by 77 days.

(21) Appl. No.: 13/851,761

(22) Filed: Mar. 27, 2013

(65) Prior Publication Data

US 2013/0280504 A1   Oct. 24, 2013

Related U.S. Application Data

(63) Continuation-in-part of application No. 13/843,682, filed on Mar. 15, 2013, which is a continuation-in-part of application No. 13/432,613, filed on Mar. 28, 2012.

(51) Int. Cl.
| | |
|---|---|
| *B32B 7/04* | (2006.01) |
| *B32B 7/14* | (2006.01) |
| *B32B 5/04* | (2006.01) |
| *B32B 27/12* | (2006.01) |
| *B32B 38/00* | (2006.01) |

(52) U.S. Cl.
CPC . *B32B 7/045* (2013.01); *B32B 5/04* (2013.01); *B32B 7/14* (2013.01); *B32B 27/12* (2013.01); *B32B 38/0012* (2013.01); *Y10T 428/24818* (2015.01)

(58) Field of Classification Search
None
See application file for complete search history.

(56) References Cited

U.S. PATENT DOCUMENTS 2,789,076 A * 4/1957 Frieder et al. .................... 428/86
3,703,730 A * 11/1972 Miller ............................. 2/272

(Continued)

FOREIGN PATENT DOCUMENTS

| EP | 0657279 | 6/1995 |
| WO | 00/13889 | 3/2000 |
| WO | 2009/002384 | 12/2008 |

OTHER PUBLICATIONS

EP International Search Report—PCT/US2013/034428 dated Jul. 3, 2013.

(Continued)

*Primary Examiner* — David Sample
*Assistant Examiner* — Donald M Flores, Jr.
(74) *Attorney, Agent, or Firm* — Amy L. Miller

(57) ABSTRACT

Laminated articles that include a first textile and a functional film layer bonded together by an adhesive layer having a distinctive, discontinuous adhesive pattern is provided. The discontinuous adhesive pattern creates regions free or substantially free of adhesive that permits the laminate to preferentially bend in those regions. The adhesive regions, together with the non-adhesive regions, create a visible pattern on the surface of the laminate. A second textile may be bonded to the functional film layer opposing the first textile. The first textile or the film layer may be elastic, shrinkable, or expandable. In such embodiments, raised portions of the laminate corresponding to the non-adhesive regions and curled portions corresponding to the adhesive regions are visible. The laminated article is waterproof, liquid-proof, breathable, and aesthetically pleasing and demonstrates a reduction in stiffness, improved insulation properties, improved stretch properties and a reduction of noise associated with bending the article.

57 Claims, 24 Drawing Sheets

(56) References Cited

U.S. PATENT DOCUMENTS

| | | | | |
|---|---|---|---|---|
| 4,081,301 A | * | 3/1978 | Buell | 156/164 |
| 4,532,316 A | | 7/1985 | Henn | |
| 4,701,964 A | * | 10/1987 | Bell et al. | 2/406 |
| 4,816,328 A | | 3/1989 | Saville et al. | |
| 4,862,730 A | | 9/1989 | Crosby | |
| 5,286,279 A | | 2/1994 | Wu | |
| 5,342,434 A | | 8/1994 | Wu | |
| 5,539,072 A | | 7/1996 | Wu | |
| 5,628,741 A | * | 5/1997 | Buell et al. | 604/385.27 |
| 5,708,044 A | | 1/1998 | Branca | |
| 5,916,829 A | * | 6/1999 | Girard et al. | 442/244 |
| 6,296,921 B1 | | 10/2001 | Blackmore et al. | |
| 6,395,383 B1 | * | 5/2002 | Maples | 428/319.3 |
| 6,541,589 B1 | | 4/2003 | Baillie | |
| 6,559,350 B1 | * | 5/2003 | Tetreault et al. | 602/42 |
| 6,562,740 B1 | | 5/2003 | Todt | |
| 7,531,611 B2 | | 5/2009 | Sabol et al. | |
| 7,601,416 B2 | * | 10/2009 | Palley | 428/171 |
| 2009/0093602 A1 | | 4/2009 | Ford | |
| 2009/0123713 A1 | * | 5/2009 | Conley et al. | 428/196 |
| 2009/0246485 A1 | | 10/2009 | Panse | |
| 2010/0248324 A1 | | 9/2010 | Xu et al. | |
| 2010/0287680 A1 | | 11/2010 | Johnson | |
| 2011/0271416 A1 | | 11/2011 | Sturgill | |
| 2013/0260111 A1 | * | 10/2013 | Kelsey et al. | 428/197 |

OTHER PUBLICATIONS

International Search Report PCT/US2014/025236 dated Aug. 11, 2014.

* cited by examiner

LAMINATED ARTICLES HAVING DISCONTINUOUS ADHESIVE REGIONS

CROSS REFERENCE TO RELATED APPLICATIONS

This application is a continuation-in-part U.S. patent application Ser. No. 13/843,682, filed Mar. 15, 2013, which, in turn, is a continuation-in-part of U.S. patent application Ser. No. 13/432,613, filed Mar. 28, 2012, the content of which is hereby incorporated by reference in its entirety.

FIELD OF THE INVENTION

The present invention relates generally to laminated articles, and more specifically, to laminated articles that include a textile layer and a film layer bonded via an adhesive layer having a distinctive, discontinuous adhesive pattern.

Definitions

As used herein, the term "laminate" means an article comprising a functional film or coating that is coated onto or adhered to at least one layer of textile.

The terms "functional film", "functional film layer", and "film layer" are meant to denote a substance that provides properties that may include, but are not limited to: a barrier to liquid (e.g., water) penetration, a barrier to penetration by chemical substances, a barrier to gas penetration, a barrier to particulate penetration, barrier to air penetration (e.g., impermeability), odor control, antimicrobial, windproof, and breathability.

As used herein, the term "textile" is meant to denote any wovens, nonwovens, felts, fleece, or knits and can be composed of natural and/or synthetic fiber materials and/or other fibers or flocking materials.

As used herein, a layer is considered "liquid-proof" if it prevents liquid penetration against a pressure of at least 0.07 bar for a duration of at least 3 minutes. The liquid penetration pressure is measured on a liquid-proof panel based on the same conditions described with respect to the Suter Test for Liquid-proof Fabrics described herein.

As used herein, the term "breathable" or "breathability" refers to laminates that have a Water Vapor Transmission Rate (WVTR) of at least about 1,000 grams/m$^2$ in 24 hours.

As used herein, the term "preferentially bends" means that one region of the laminate bends to a larger degree than a second region of the laminate when identical or substantially identical forces are applied to both regions. For instance, in the instant invention, preferential bending occurs in the regions free or substantially free of adhesive (e.g., unbonded regions) when the free edges of the laminate are grasped and moved toward each other.

BACKGROUND OF THE INVENTION

Waterproof, breathable garments are well-known in the art. These garments are often constructed from multiple layers in which each layer adds a certain functionality. For example, a garment could be constructed using an outer textile layer, a waterproof, breathable film layer, and an inner textile layer. It is often desirable to have the multiple layers bonded together with an adhesive layer to create a laminate and prevent the layers from sliding past each other to give the look and feel of a single-layered garment. The process of bonding the layers together, however, has the detrimental effects of making the garment stiffer and noisier when worn. This not only reduces the enjoyment of wearing these garments, but can also affect performance in applications where noise control is critical, such as in hunting or military applications.

In addition to the stiffness and noise concerns, there are other reasons that a uniformly bonded laminate may be undesirable. For instance, if tensions are not well-controlled during the lamination process, the resulting laminate can curl due to the residual stresses created during lamination. Such curling of the laminate makes garment construction problematic as it is difficult to lay the pieces flat while sewing. Conversely, if the layers are not bonded together at all, the complexity of garment construction may increase due to each material having to be cut and laid out separately.

Further concerns with uniformly bonded laminates arise when stretch properties are desirable within waterproof, breathable garments and articles. Issues ranging from fit to donning and doffing ease to comfort during movement, to name but a few, can be significant challenges when working with uniformly bonded laminates. Conventional stretchable waterproof breathable garments have been described in, for example, U.S. Pat. No. 4,443,511, and U.S. Pat. No. 4,935,287. Limitations still exist with respect to the high stretch forces required to stretch these uniformly bonded laminate materials.

Therefore, a need in the art exists for a laminate article that can maintain the positive attributes of a bonded, multi-layer article while reducing noise, stiffness, stretch force and residual lamination stresses.

SUMMARY OF THE INVENTION

It is an object to provide a laminated article that includes (1) a functional film layer, (2) a first textile; and (3) a first adhesive layer bonding the functional film layer and the first textile. The first adhesive layer contains two or more adhesive regions separated by regions that are substantially free of adhesive. The adhesive regions may contain a plurality of adhesive dots. In at least one embodiment, the adhesive dots are substantially the same size. The distance between adjacent adhesive dots within the adhesive regions is less than a distance between consecutive adhesive regions within the laminate. In addition, in at least one embodiment, the adhesive regions form at least one distinctive shape that is repeated two or more times. The distinctive shape may be a geometric or abstract shape. Additionally, the laminated article preferentially bends in the regions substantially free of adhesive. The adhesive regions may have a width greater than about 5 mm and the regions substantially free of adhesive may have a width greater than about 2 mm. The adhesive regions may represent greater than or equal to at least 50% of the laminate area.

It is another object to provide a laminated article that includes (1) a functional film layer, (2) a first textile, and (3) a first adhesive layer bonding the functional film layer to the first textile. The adhesive layer contains adhesive regions and regions substantially free of adhesive that are interspaced between the adhesive regions. The regions substantially free of adhesive have a width greater than about 2 mm. Further, the laminated article preferentially bends in the regions that are substantially free of adhesive. In one exemplary embodiment, a second textile is bonded to the functional film layer opposite the first film layer by a second adhesive layer. An air gap is positioned between the functional film layer and the second textile in raised, visible portions that outline the adhesive regions. The adhesive regions may each contain a plurality of dots. A bending modulus of the regions substantially free of adhesive is at least 20% less than a bending modulus of the adhesive regions.

It is yet another object to provide a laminated article that includes (1) a functional film layer, (2) a first textile, and (3) a first adhesive layer bonding the functional film layer and the first textile. The adhesive layer contains first adhesive regions and second adhesive regions. In addition, the first adhesive regions contain an amount of adhesive that is greater than an amount of adhesive present in the second adhesive regions. In one exemplary embodiment, the first adhesive regions contain a plurality of adhesive dots. Also, the laminated article has a bending modulus in the second adhesive regions that is lower than a bending modulus in the first adhesive regions. The second adhesive regions may be substantially free of adhesive. The distance between consecutive first adhesive regions is greater than about 2 mm.

It is a further object to provide a laminated article that includes a functional film layer and a first textile bonded to the functional film layer by a first adhesive layer that includes (1) two or more adhesive dots and (2) a continuous path substantially free of adhesive. The continuous path provides a region where the laminate preferentially bends. In addition, each set of adhesive dots forms an adhesive region. The radius of curvature of each adhesive region is from about 2 mm to about 50 mm. Also, the continuous path forms a raised, visible portion outlining the adhesive regions in at least one exemplary embodiment. A second textile may be bonded to the functional film layer opposite the first textile by a second adhesive layer. In another exemplary embodiment, at least one of the first textile and the adhesive dots contain a fire retardant or fire resistant material.

It is also an object to provide a laminated article that includes (1) a functional film layer and (2) a first textile bonded to the functional film layer by a first adhesive layer. The first adhesive layer contains at least one first region having a first percent area coverage of adhesive and at least one second region having a second percent area coverage of adhesive. The first percent area coverage of adhesive is greater than the second area coverage of adhesive. In exemplary embodiments, the second adhesive region is free or substantially free of adhesive. Additionally, the first region forms at least one distinctive shape that is repeated two or more times. The second region may form a raised, visible portion outlining the distinctive shape, which has a geometric or abstract form. In at least one embodiment, a second textile is bonded to the film layer opposite the first textile by a second adhesive layer. An air gap may be positioned between the film layer and the second textile in a raised, visible portion.

It is a further object to provide a method of forming a laminated article that includes bonding a functional film layer and a first textile via a first adhesive layer where the first adhesive layer contains adhesive regions and regions substantially free of adhesive. The functional film may be a fluoropolymer. The regions substantially free of adhesive are interspaced between the adhesive regions. In one or more exemplary embodiment, the regions substantially free of adhesive form a raised, visible portion outlining the adhesive regions. The adhesive regions have at least one distinctive shape, which may be repeated two or more times. Additionally, the regions substantially free of adhesive have a width greater than about 2 mm. Further, the laminated article preferentially bends in the regions substantially free of adhesive. The method may further include tensioning the functional film prior to positioning the functional film on the first adhesive layer. In at least one exemplary embodiment, the method also includes bonding a second textile to the functional film opposite the first textile by a second adhesive layer. An air gap may be positioned between the functional film layer and the second textile in the raised portion. In an alternate embodiment, the adhesive regions are formed by pressing the textile into a patterned rubber roll. Alternatively, a release paper may be used to form the adhesive regions. In such an embodiment, the method further includes (1) positioning a release paper on the first textile prior to applying the first adhesive layer and (2) removing the release paper from the first textile prior to positioning the functional film on the first adhesive layer. In a further embodiment, a gravure roll is used to transfer the adhesive layer to the film layer. Further, the first textile or the first adhesive layer may include a fire retardant material or fire resistant material.

It is also an object of the invention to provide a method of forming a laminated article that includes (1) tensioning an elastomeric film, (2) bonding a functional film layer and the tensioned elastomeric film to create a bonded elastomeric film layer, (3) tensioning the bonded elastomeric film layer and bonding it to a first textile by a first adhesive layer and (4) allowing the laminated article to relax, resulting in a curling of the laminated article in the areas corresponding to the adhesive regions. The first adhesive layer contains adhesive regions and regions substantially free of adhesive. The regions substantially free of adhesive are interspaced between said adhesive regions which have at least one distinctive shape. A distance between consecutive the adhesive regions may be greater than about 2 mm. In exemplary embodiments, the laminate has a stretch force at 20% elongation of less than three times the stretch force of said first textile. In addition, the laminate has a stretch force at 20% elongation of less than two times the stretch force of the functional film layer.

It is a further object of the present invention to provide a method of forming a laminated article that includes (1) tensioning a first textile to achieve reduction in width of the first textile, (2) bonding a functional film layer and the first textile via a first adhesive layer, and (3) reducing the tension on the first textile and allowing the first textile to expand in a direction perpendicular to the direction of tension, which results in a bunching of the first textile in the regions substantially free of adhesive. The first adhesive layer contains adhesive regions and regions substantially free of adhesive. Also, the regions substantially free of adhesive are interspaced between the adhesive regions and the adhesive regions have at least one distinctive shape.

It is a further object of the present invention to provide a method of forming a laminated article that includes (1) bonding a shrinkable functional film layer to a first textile via a first adhesive layer to from a laminated article, and (3) shrinking the functional film which results in a curling of the laminated article in the areas corresponding to the adhesive regions. The first adhesive layer contains adhesive regions and regions substantially free of adhesive. Also, the regions substantially free of adhesive are interspaced between the adhesive regions and the adhesive regions have at least one distinctive shape. In exemplary embodiments, the laminate has a stretch force at 20% elongation of less than three times the stretch force of the first textile. The laminated article curls towards the functional film layer. In at least one exemplary embodiment, the first textile is shrinkable and the method further includes shrinking the first textile.

It is yet another object of the present invention to provide method of forming a laminated article that includes (1) bonding a functional film layer to a shrinkable textile via a first adhesive layer to from a laminated article, and (2) shrinking the textile which results in a curling of the laminated article in the areas corresponding to the adhesive regions. The first adhesive layer contains adhesive regions and regions substantially free of adhesive. The regions substantially free of adhesive are interspaced between the adhesive regions and the adhesive regions have at least one distinctive shape. In exemplary embodiments, the laminate has a stretch force at 20% elongation of less than three times the stretch force of the first textile.

It is an advantage that the laminated articles demonstrate a reduction in stiffness, improved insulation properties, improved specular reflection, and a reduction of noise associated with bending the article.

It is a further advantage that the laminated articles exhibit improved stretch properties relative to conventional waterproof, breathable laminate constructions. Additionally, laminated articles including a knitted textile which exhibit bunching, or the creation of a gap between the knitted textile and the film layer, in the direction perpendicular to the knit rows of the textile for improved flexing of the article are also contemplated.

It is a feature of the present invention that the film layer can be a fluoropolymer.

It is also a feature of the present invention that the textile and/or the adhesive may comprise a fire retardant or fire resistant material.

It is another feature of the present invention that the laminate has a stretch force at 20% elongation of less than three times the stretch force of the first textile.

It is yet another feature of the present invention that the laminate has a stretch force at 20% elongation of less than two times the stretch force of said functional film layer.

The foregoing and other objects, features, and advantages of the invention will appear more fully hereinafter from a consideration of the detailed description that follows. It is to be expressly understood, however, that the drawings are for illustrative purposes and are not to be construed as defining the limits of the invention.

BRIEF DESCRIPTION OF THE FIGURES

The advantages of this invention will be apparent upon consideration of the following detailed disclosure of the invention, especially when taken in conjunction with the accompanying drawings wherein.

DETAILED DESCRIPTION OF THE INVENTION

Figure 1:
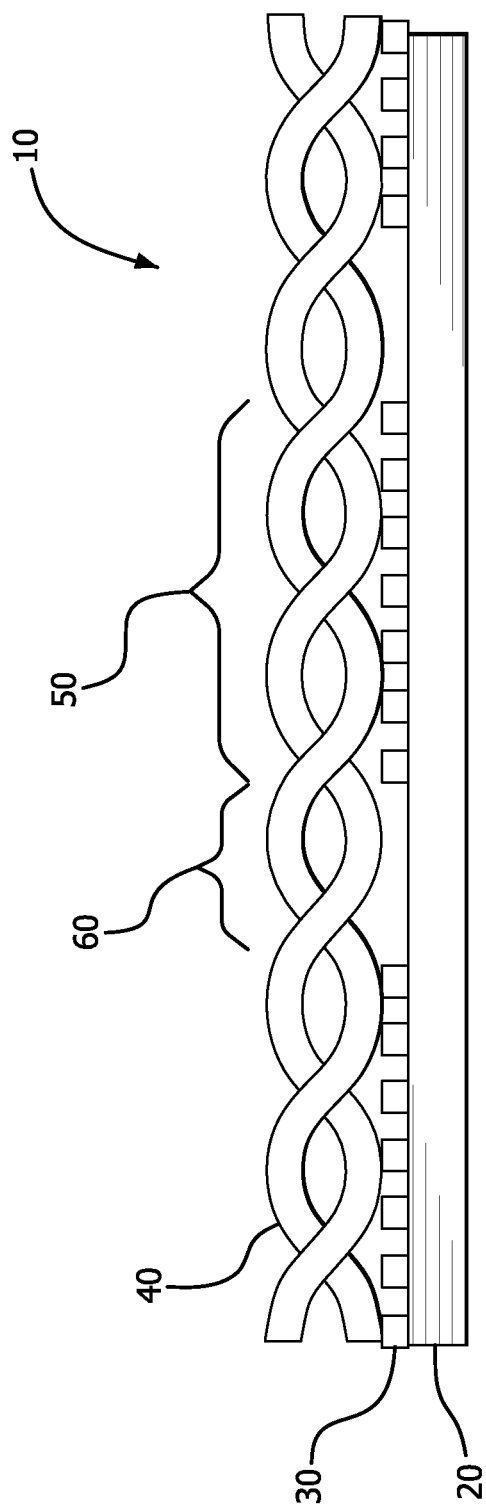
FIG. 1 is a schematic illustration of a two-layer laminate having discontinuous adhesive dots in the bonded regions according to at least one exemplary embodiment of the invention.

Unless defined otherwise, all technical and scientific terms used herein have the same meaning as commonly understood by one of ordinary skill in the art to which the invention belongs. In the drawings, the thickness of the lines, layers, and regions may be exaggerated for clarity. It will be understood that when an element such as a layer is referred to as being "on" another element, it can be directly on the other element or intervening elements may also be present. Also, when an element is referred to as being "adjacent" to another element, the element may be directly adjacent to the other element or intervening elements may be present. The terms "top", "bottom", "side", and the like are used herein for the purpose of explanation only. Like numbers found throughout the figures denote like elements. The terms "film layer" and "functional film layer" may be used interchangeably herein. Also, the terms "laminate" and "laminated article" may be used interchangeably herein. In addition, the terms "bonded region" and adhesive region" may be used interchangeably herein.

The present invention is directed to laminated articles that include a first textile and a functional film layer bonded via an adhesive layer having a distinctive, discontinuous adhesive pattern. The discontinuous adhesive pattern creates a visible, aesthetically pleasing surface on the first textile. Additionally, the discontinuous adhesive pattern creates regions free or substantially free of adhesive within the laminated article that permits the laminate to preferentially bend in those regions. A second textile may optionally be bonded to the film layer on the side opposing the first textile by an adhesive. In at least one exemplary embodiment, at least one of the first textile and the film layer is elastic or otherwise stretchable. The laminated article is waterproof, liquid-proof, breathable, and demonstrates a reduction in noise generated by bending the article and an improvement in insulative value and spectral reflection.

The laminated articles of the present invention further exhibit a surprisingly low stretch force, as measured and described later herein, relative to the stretch force required to stretch the first textile alone. For comparison purposes, conventional uniformly laminated materials promoted as having stretch properties can typically exhibit stretch forces on the order of at least 5 times (5×) greater than the stretch force of the first textile alone. The novel laminated articles of the present invention may exhibit stretch forces which are on the order of only three times (3×) or less greater than the stretch force of the first textile alone. In an alternative embodiment, laminated articles of the present invention may exhibit stretch forces which are on the order of only 2 times (2×) or less greater than the stretch force of the first textile alone. Alternatively, embodiments of the laminated articles of the present invention may exhibit stretch forces which are substantially the same as (1×) or even less than the stretch force of the first textile alone. In even further alternative embodiments, stretch forces for the laminated article may be on the order of one half (0.5×) or less of the stretch force required to stretch the first textile alone. In other alternative embodiments, the stretch force may be on the order of one third (0.33×) or less of the stretch force required to stretch the first textile alone. Other embodiments of the present invention may exhibit stretch forces on the order of one sixth (0.16×) or less of the stretch force required to stretch the first textile alone.

In another embodiment of the invention, laminated articles including a knitted textile are contemplated which exhibit "bunching", or the creation of a gap between the knitted textile and the film layer in the unbonded regions, when the knitted textile expands in at least one direction, resulting in increased thickness of the article.

Figure 2:
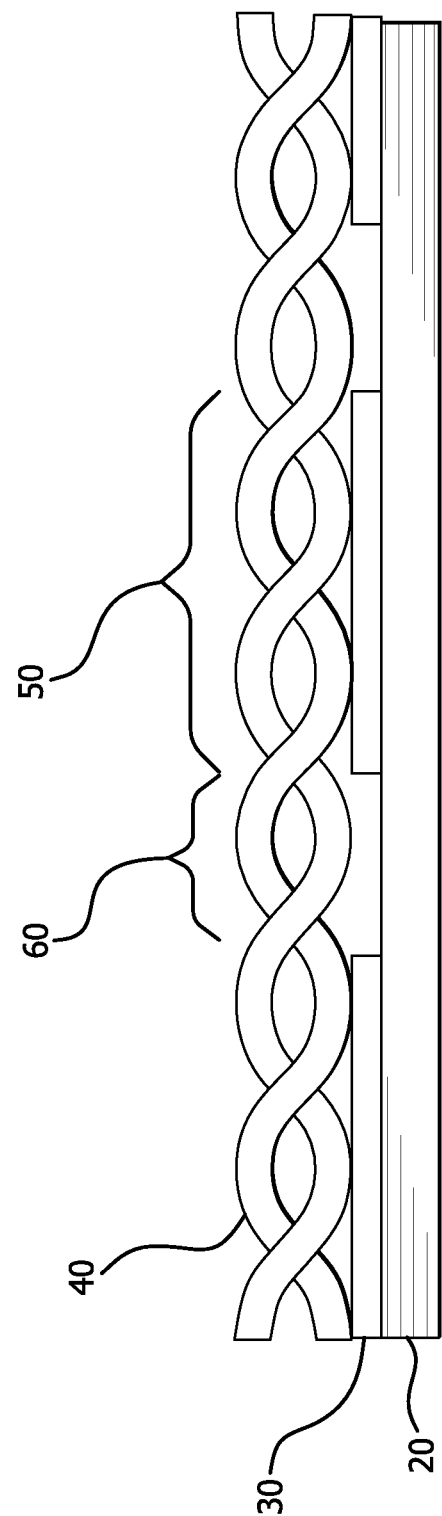
FIG. 2 is a schematic illustration of a two-layer laminate having a continuous adhesive in the bonded regions according to another exemplary embodiment of the invention.

Turning to FIG. 1, a two-layer laminate 10 according to one embodiment of the invention can best be seen. As shown in FIG. 1, a film layer 20 has applied thereto an adhesive 30 to bond the first textile 40 to the film layer 20. It is to be appreciated that the adhesive 30 may be applied to the film layer 20 or to the first textile 40 (or to both the film layer 20 and the first textile 40). For ease of discussion, application of the adhesive 30 to the film layer 20 is described herein. The adhesive 30 is applied to the film layer 20 in a distinctive, discontinuous pattern such that the adhesive 30 contains bonded (adhesive) regions 50 separated by unbonded (non-adhesive) regions 60. The adhesive 30 may be applied as a series of discontinuous dots, such as shown in FIG. 1, or may be applied in a solid, continuous pattern within the bonded regions 50 as depicted in FIG. 2.

The adhesive dots within the bonded regions 50 may have the same or substantially the same size or may vary in size within one bonded region or from one bonded region to another. In an alternative embodiment, the adhesive dots may be distributed non-uniformly within the adhesive regions. Other adhesive patterns within the bonded regions 50 such as grids, lines, or other patterns are considered to be within the purview of the invention, and such adhesive may be distributed uniformly or non-uniformly within the adhesive region (s).

Figure 21:
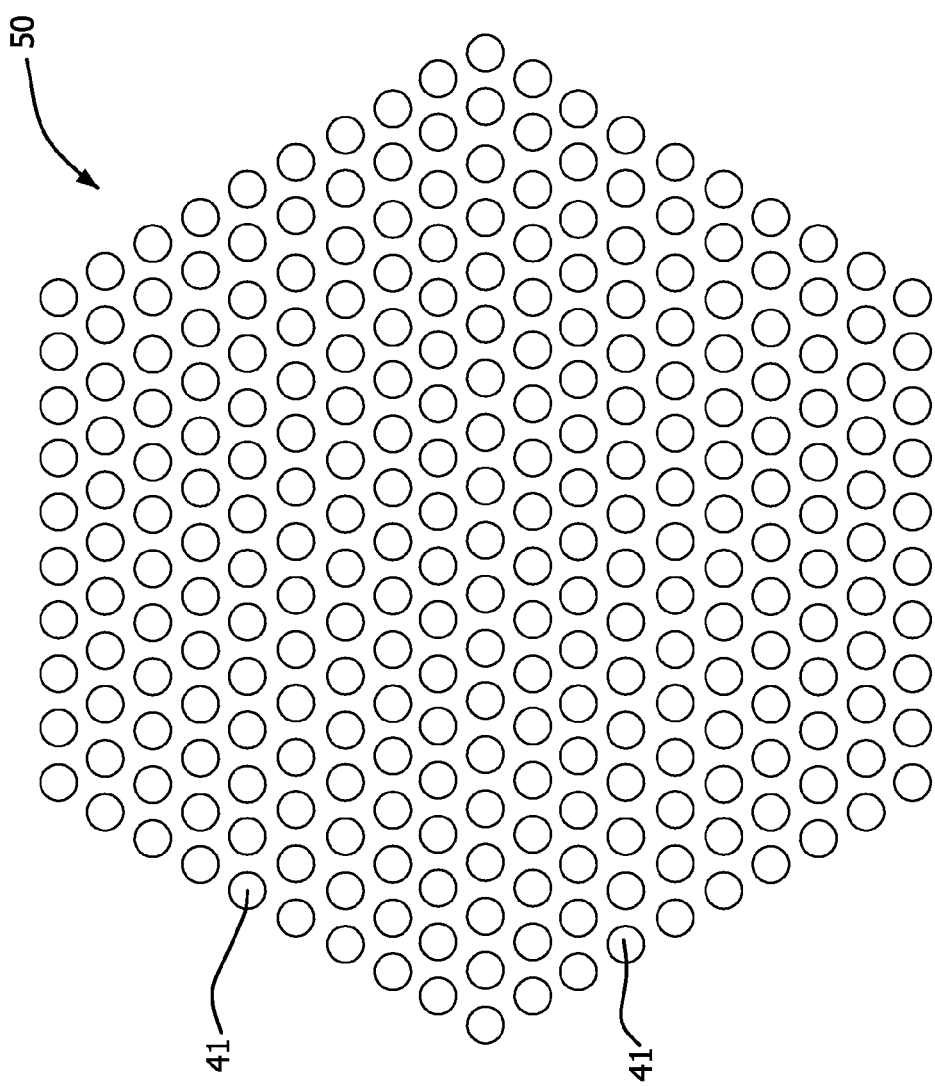
FIG. 21 is a schematic illustration of an exemplary adhesive region where the adhesive dots have substantially the same diameter throughout the adhesive region.
Figure 22:
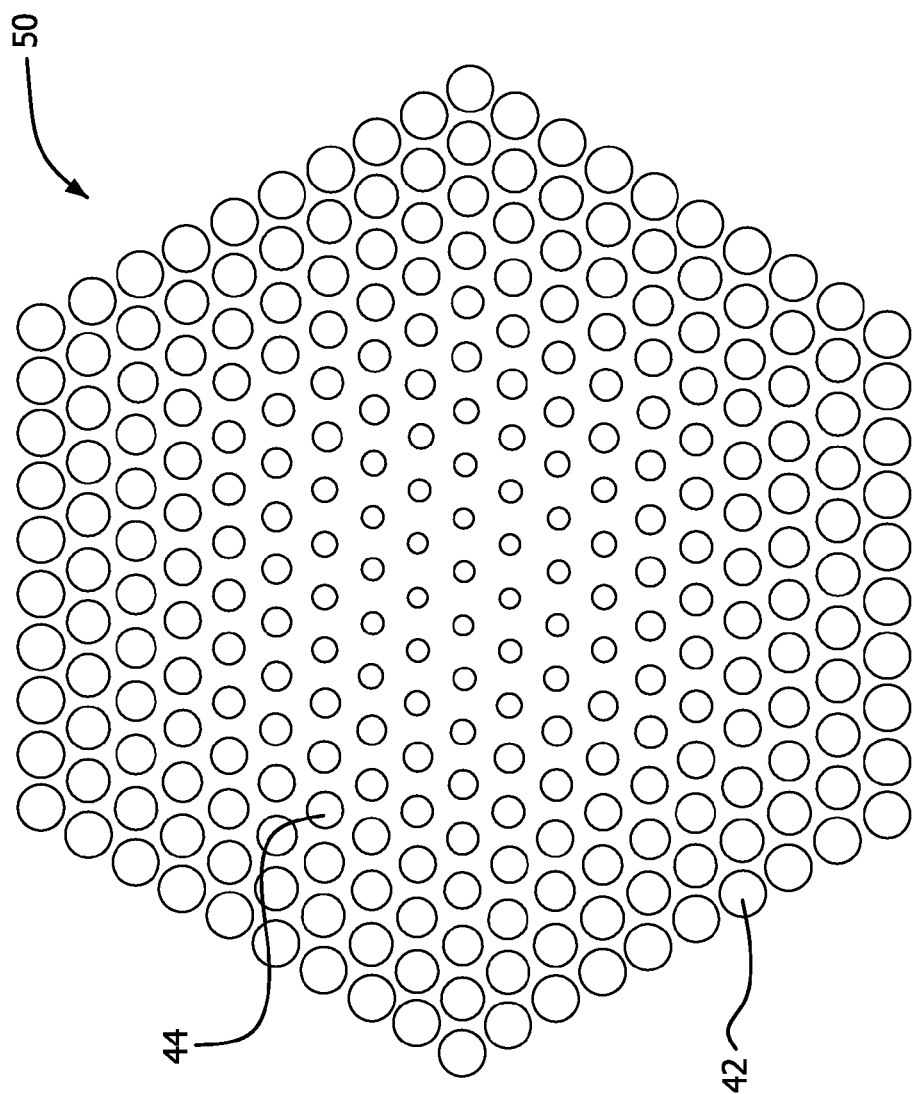
FIG. 22 is a schematic illustration of an exemplary adhesive region where the adhesive dots positioned on the outer portion of the adhesive region have a diameter that is larger than adhesive dots positioned in an inner portion of the adhesive region.

For example, the adhesive dots 40 may have substantially the same diameter throughout the bonded regions 50, such as is illustrated in FIG. 21. The distance between adjacent adhesive dots 41 within the bonded regions 50 may be less than a distance between consecutive bonded regions 50. Alternatively, the adhesive dots positioned on the outer portion of the bonded region 50 may have a diameter that is larger than adhesive dots positioned in an inner portion of the bonded region 50. Looking at FIG. 22, it can be seen that the adhesive dots 42 have a larger diameter than adhesive dots 44. Additionally, as shown in FIG. 22, the adhesive dots may get sequentially smaller in diameter from the outer portion of the bonded region 50 to the inner portion of the bonded region 50. Also, the distance between dots 42, 44 may vary within the bonded region 50 (not illustrated).

Figure 23:
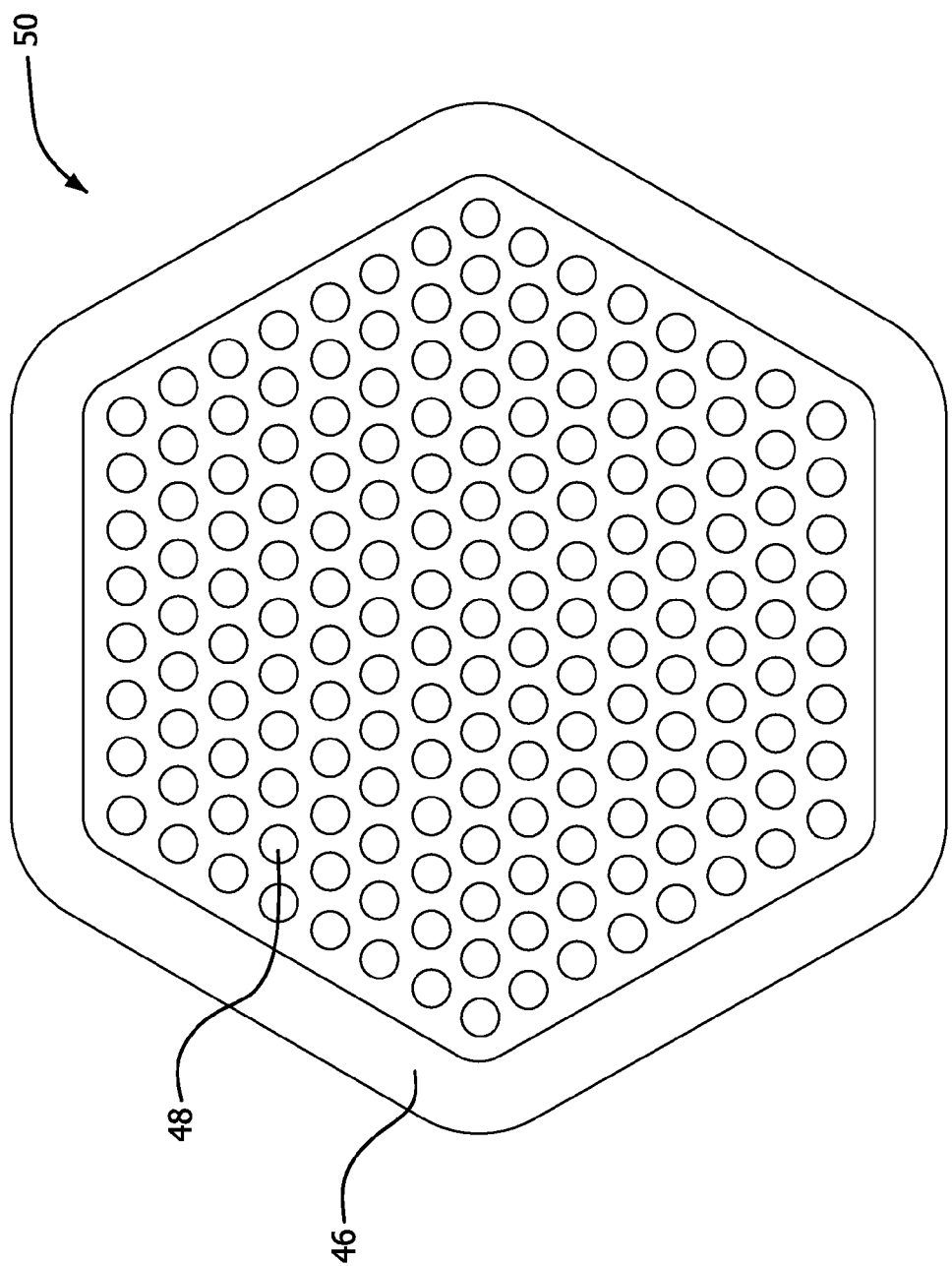
FIG. 23 is a schematic illustration of an exemplary adhesive region where an outer portion of the adhesive region is formed of a continuous or substantially continuous band of adhesive surrounding a plurality of adhesive dots having substantially the same diameter.

In other embodiments, the adhesive 30 may be applied in both a continuous and discontinuous manner within the adhesive region 50. One such example is shown in FIG. 23 where an outer portion of the adhesive region 50 is formed of a continuous or substantially continuous band of adhesive 46 surrounding a plurality of adhesive dots 48 having substantially the same diameter. It is to be appreciated that the adhesive dots 48 located within the band of adhesive 46 may vary in diameter, may themselves form a distinctive pattern, or may sequentially get larger or smaller in diameter moving towards the center of the adhesive region 50, and that such embodiments are considered within the purview of the invention.

Figure 24:
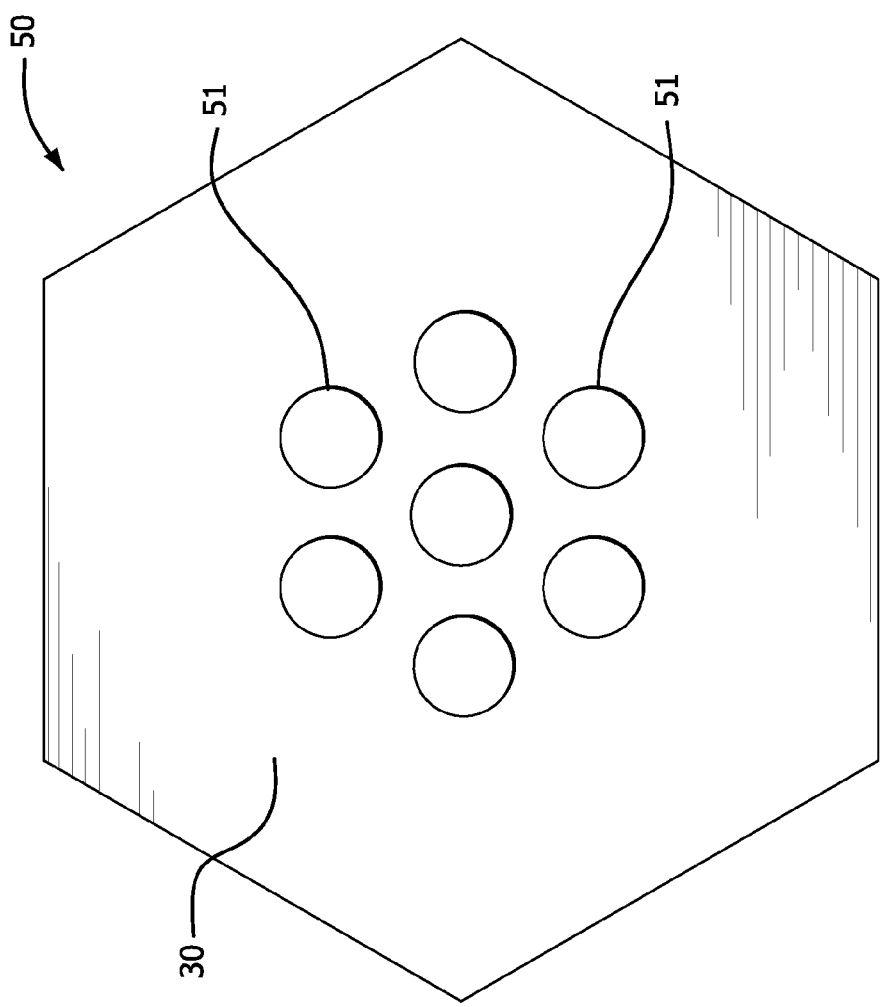
FIG. 24 is a schematic illustration of an exemplary adhesive region where the adhesive is applied in a manner so as to form centrally located circular regions that are free or substantially free of adhesive.
Figure 25:
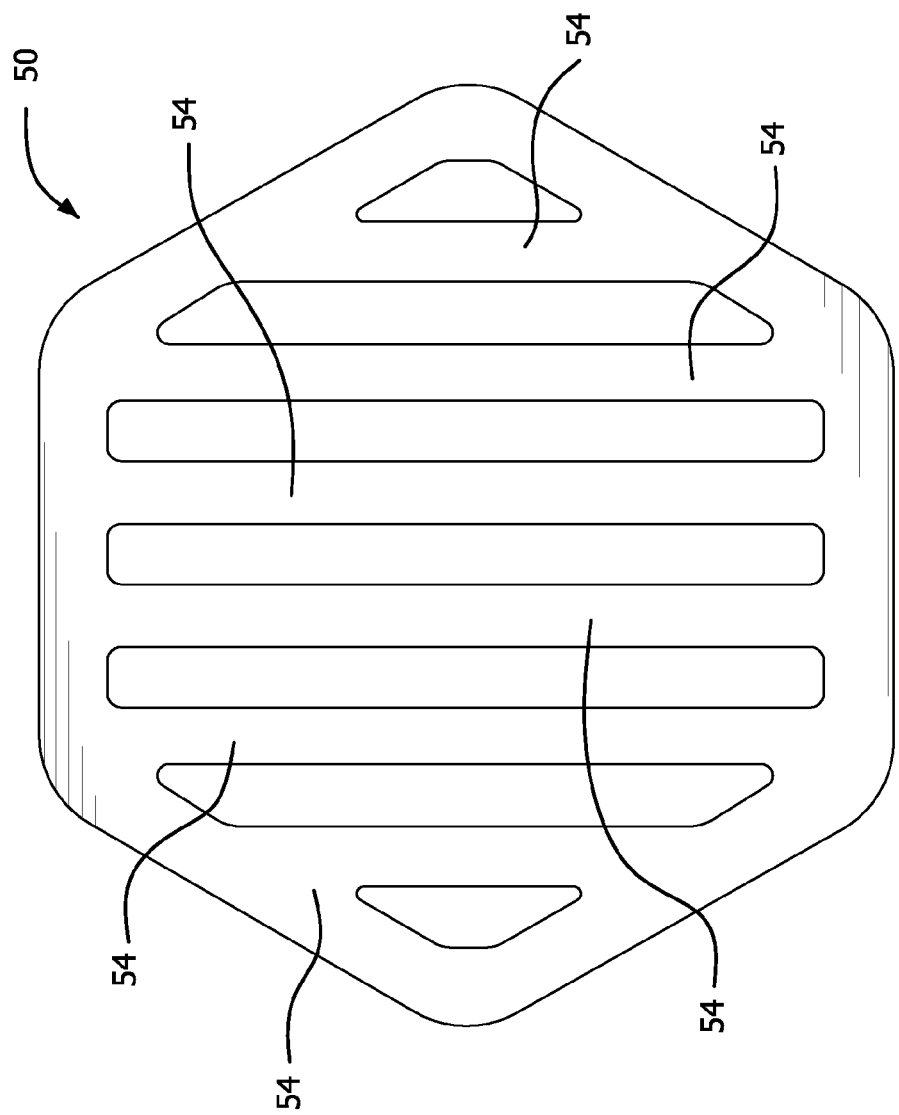
FIG. 25 is a schematic illustration of an exemplary adhesive region where the adhesive is applied to form a grid-like pattern within the adhesive region.

In some other embodiments, the adhesive 30 may be applied to form a pattern within the adhesive region 50. In FIG. 24, an adhesive 30 is applied in a manner so as to form centrally located circular regions 52 that are free or substantially free of adhesive. Although only seven circular regions 52 are illustrated in FIG. 24, it is to be understood that fewer or more circular regions 52 may be present. It is to be understood that the regions do not have to be circular in nature and that adhesive free regions in the adhesive region 50 may have any shape. In another exemplary embodiment, the adhesive 30 may be applied to form a grid-like pattern, such as is depicted in FIG. 25. More specifically, strips of adhesive 54 are positioned within the adhesive region 50 such that the strips 54 are substantially parallel to each other with non-adhesive regions interspacing the adhesive strips 54. It is to be appreciated that strips of adhesive crossing strips 54 in a substantially perpendicular orientation to form a "grid" (not illustrated) is considered to be within the scope of the invention.

It is to be understood that the patterns of adhesive within the adhesive regions 50 depicted in FIGS. 21-25 are merely exemplary in nature and that other adhesive and/or non-adhesive patterns within the adhesive region 50 are considered to be within the scope of the invention. It is also to be appreciated that the adhesive may be distributed uniformly or non-uniformly within the adhesive region(s) in any pattern within the adhesive region 50.

Figure 3:
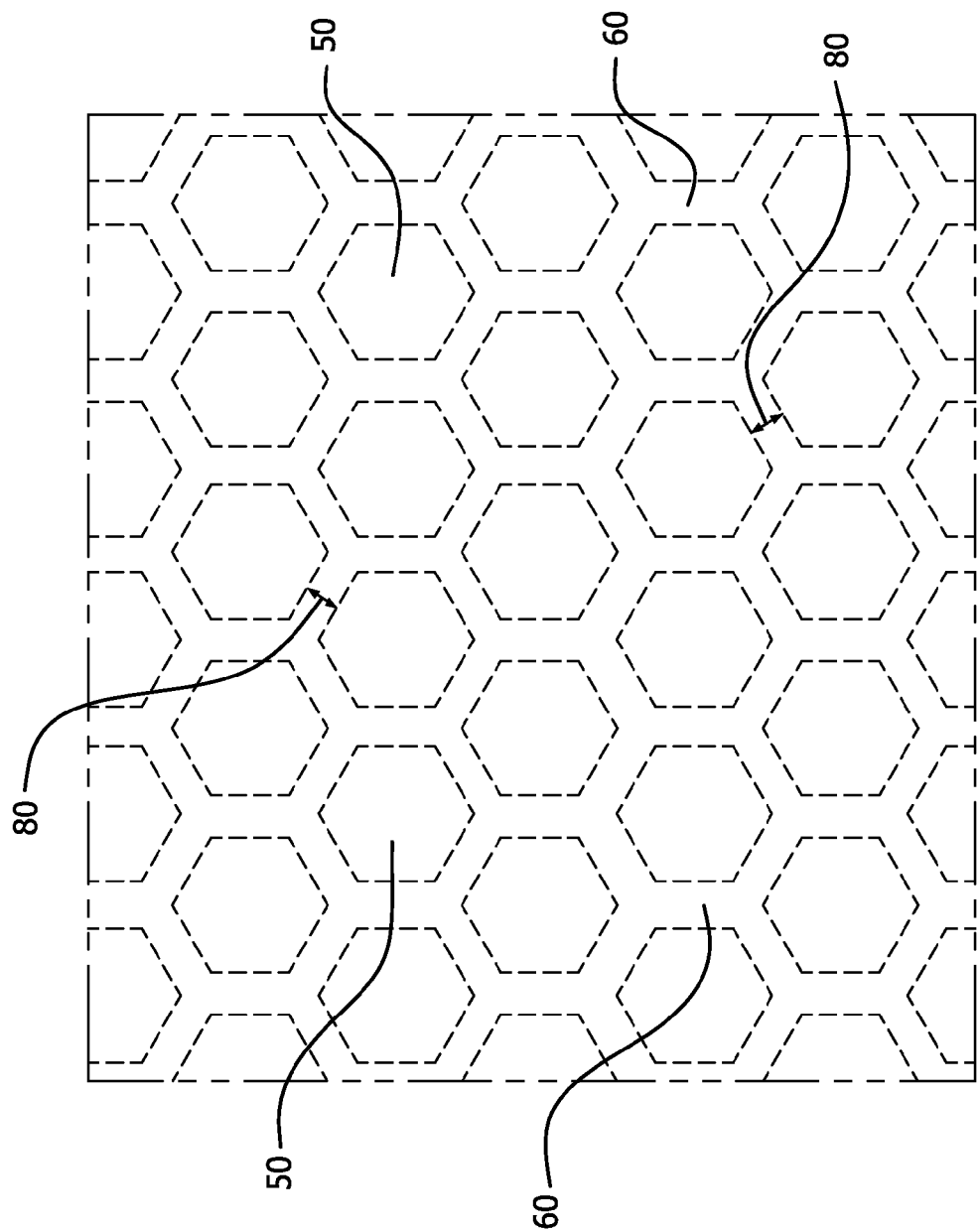
FIG. 3 is a top view of the laminate of FIG. 1 or 2 illustrating the pattern formed by the bonded and unbonded regions according to one embodiment of the invention.

The adhesive 30 is also applied to the film layer 20 such that the bonded regions 50, together with the unbonded regions 60, create a visible pattern on the surface of the laminate 10. FIG. 3 illustrates an exemplary embodiment where the bonded regions 50 and unbonded regions 60 form a visible hexagonal pattern on the exterior surface of the first textile 40 of the laminate 10 (shown in FIG. 2). The adhesive 30 may be breathable or non-breathable and can be applied to the film layer 20 by any conventional manner, such as, but not limited to, gravure printing, screen printing, and transfer printing.

It is to be appreciated that the pattern formed by the bonded and unbonded regions 50, 60, respectively can have any geometric (e.g., square, circular, rectagonal, octagonal, etc.) or abstract shape, and is generally repeated two or more times. In addition, the unbonded regions 60 are free or substantially free of adhesive. Further, these unbonded regions 60 may form a continuous path within the laminate 10 that is free or substantially free of adhesive. In at least the example depicted in FIG. 3, the bonded regions 50 are separated by the unbonded regions by a distance represented by double sided arrow 80. This unbonded distance may be greater than about 2 mm, and in exemplary embodiments, may range from about 2 mm to about 20 cm, from about 2 mm to about 10 cm, from about 2 mm to 20 mm, or from about 2 mm to about 10 mm. Also, the bonded regions may have a width of at least 2 mm, 3 mm, 4 mm, 5 mm, 7 mm, or 10 mm or more. In exemplary embodiments, the width of the bonded region is from about 5 mm to about 10 cm or from about 5 mm to about 50 mm.

It is to be appreciated that the bonded and unbonded regions 50, 60, respectively can vary in size depending on the desired physical appearance and attributes. In one or more exemplary embodiment, the width of the bonded region is greater than the distance between consecutive bonded regions (e.g., unbonded regions), the "width" being generally defined herein as the greatest distance from one side of the region to the other.

Additionally, the percent area coverage of the bonded regions in the laminate may represent greater than or equal to at least 30%, at least 40%, or at least 50% of the laminate area, and in some embodiments, greater than or equal to about 60% or 70% or greater. As used herein, the term "percent area coverage of the bonded regions" is defined as the total two-dimensional area of adhesive regions within the laminate (although it is not required, the adhesive regions generally form the bonded regions) divided by the total area of the laminate, multiplied by 100%. In any event, the amount of adhesive present in the bonded regions 50 is greater than the amount of adhesive present in the unbonded regions 60. In exemplary embodiments, the amount of adhesive (e.g., mass or volume of adhesive) present in the bonded regions 50 is at least 10% greater, 20% greater, or even 30% greater (or more) than the amount of adhesive present in the unbonded regions 60. Also, the distance between adjacent adhesive dots within the bonded regions 50 may be less than a distance between consecutive bonded regions 50. As used herein, the term "consecutive bonded regions" or "consecutive regions" is meant to describe adjacent regions. The adhesive may optionally be a fire resistant adhesive or contain a fire resistant or retardant material to provide fire retardancy to the laminate. Non-limiting examples of fire resistant or retardant materials include, for example, aramids, polybenzimidazole (PBI), poly p-phenylene-2, 6-bezobisoxazole (PBO), modacrylic blends, polyamines, flame resistant rayon, polyamines, carbon, polyacrylonitrile (PAN), and blends and combinations thereof.

The film layer 20 may be a fluoropolymer membrane such as expanded polytetrafluoroethylene (ePTFE), expanded modified polytetrafluoroethylene, polytetrafluoroethylene (PTFE), ePTFE or PTFE films coated with protective coatings such as polyurethanes; polylolefin films, polyurethane films; silicone and silicon-containing films; as well as other fluoropolymer-containing films such as skived PTFE and fluorinated ethylene propylene (FEP); and composites having polytetrafluoroethylene membranes. Patents have been filed on expandable blends of PTFE, expandable modified PTFE, and expanded copolymers of PTFE, such as U.S. Pat. No. 5,708,044 to Branca; U.S. Pat. No. 6,541,589 to Baillie; U.S. Pat. No. 7,531,611 to Sabol et al.; U.S. patent application Ser. No. 11/906,877 to Ford; and U.S. patent application Ser. No. 12/410,050 to Xu et al. In at least one exemplary embodiment, the film layer 20 is ePTFE at least partially coated with polyurethane. Alternate protective coatings could be used such as, but not limited to, those described in U.S. Pat. No. 6,395,383 to Maples and U.S. Pat. Nos. 5,286,279; 5,342,434; and 5,539,072 to Wu.

The first textile 40 can be any woven, nonwoven, felt, or knit and may be formed of natural and/or synthetic fiber materials. The first textile 40 may be inelastic or elastic or may otherwise be manipulated to change dimensions (e.g., shrink or elongate). As used herein, the term "elastic" is meant to denote a material that can be tensioned and then returns to its approximate original dimensions upon release of the tension. It should be understood that elastic properties can be imparted by the textile(s), film layer(s), adhesive(s), or combinations thereof. Non-limiting examples of suitable textiles for use as the first textile 40 include nylon, polyester, polypropylene, cotton, wool, silk, aramid, polyethylene, rayon, acrylic, olefin, spandex, and the like. Additionally, the first textile 40 may be a fire resistant or fire retardant textile. The first textile 40 may also contain UV protective materials and/or may otherwise be coated or treated to provide desired characteristics.

Figure 4:
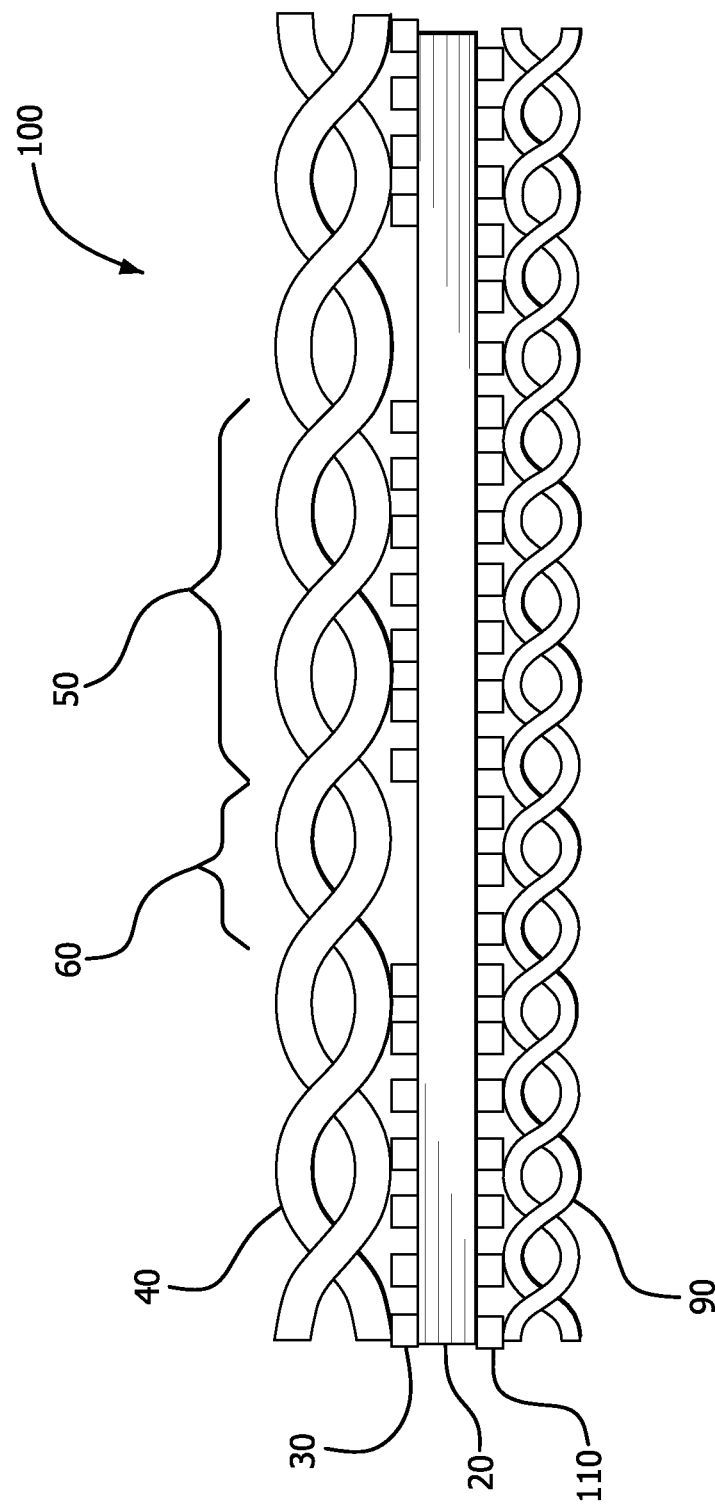
FIG. 4 is a schematic illustration of a three-layer laminate having discontinuous adhesive dots in the bonded regions according to at least one exemplary embodiment of the invention.
Figure 5:
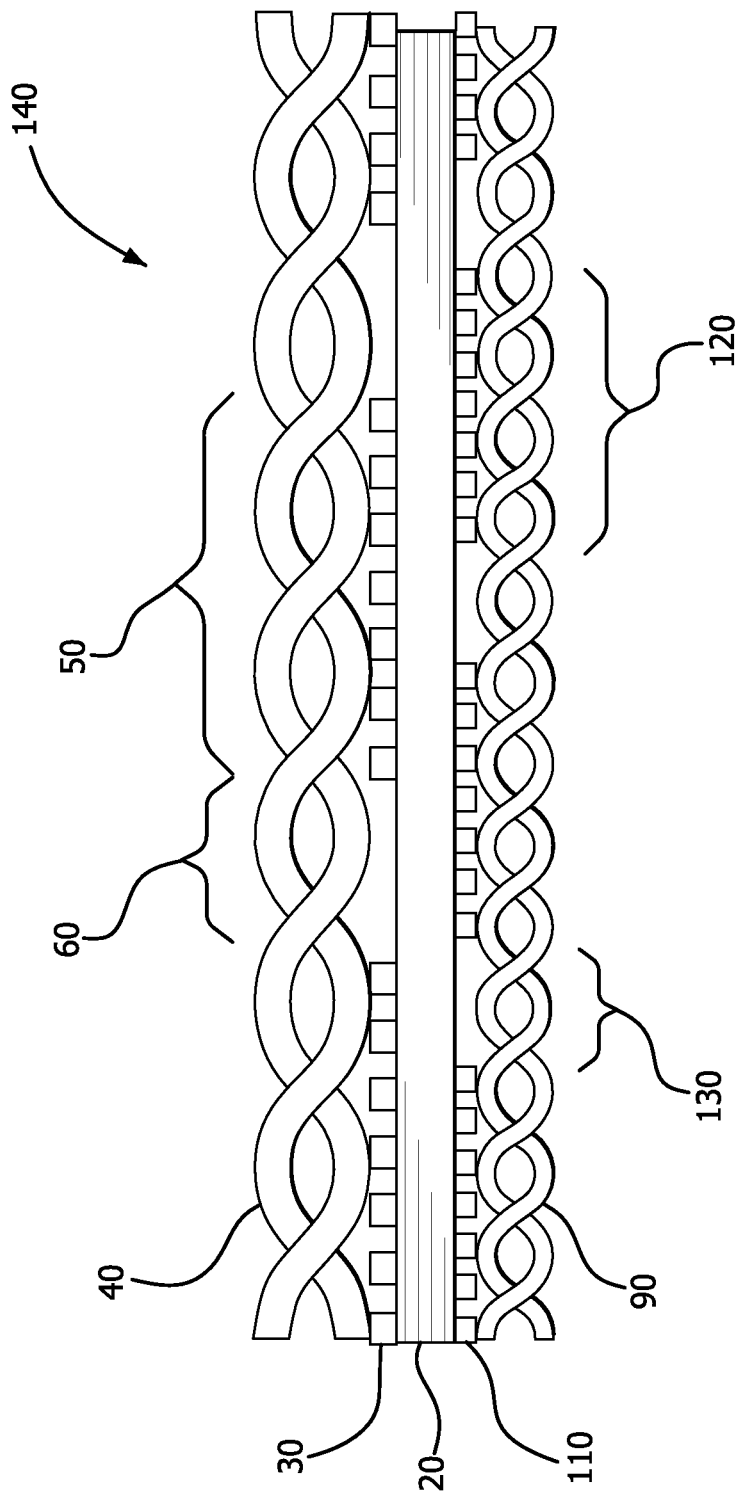
FIG. 5 is a schematic illustration of a three-layer laminate containing bonded and unbonded regions on both the top and bottom surfaces of the laminate according to another exemplary embodiment of the invention.

In at least one embodiment of the invention, a second textile 90 is bonded to the film layer 20 on the side opposing the first textile 40 to form a three-layer laminate 100. The second textile 90 may be any of the textiles described above with reference to the first textile 40 and may be the same as or different from the first textile 40. The second textile 90 is bonded to the film layer 20 by adhesive 110, which can be applied in a continuous (i.e., a coherent layer of adhesive within an adhesive region) or discontinuous (i.e., individual, discrete portions of adhesive within an adhesive region) manner. If applied in a continuous manner, the adhesive must be breathable in order to maintain the breathability of the laminate 100. The adhesive need not be breathable if applied in a suitable discontinuous manner that affords sufficient breathability through the regions without adhesive material. FIG. 4 depicts adhesive 110 as a series of discontinuous dots, although the adhesive may be applied in a discontinuous manner, such as, for example, as is shown in FIG. 5. The discontinuous application of adhesive 110 as shown in FIG. 5 results in the formation of bonded regions 120 and unbonded regions 130 on the bottom side of the laminate 140. As a result, laminate 140 contains a distinctive pattern on both the top surface and bottom surface. Although not wishing to be bound by theory, it is believed that the inclusion of bonded and unbonded regions on both the top and bottom surfaces of the laminate result in a further reduction in stiffness, a further reduction in noise, and increased breathability. As with adhesive 30, adhesive 110 can be applied to the film layer 20 by any known conventional application method. Although not depicted in FIG. 4 or 5, the bonded regions 50 may contain a continuous adhesive pattern instead of a discontinuous adhesive pattern as shown.

Figure 6:
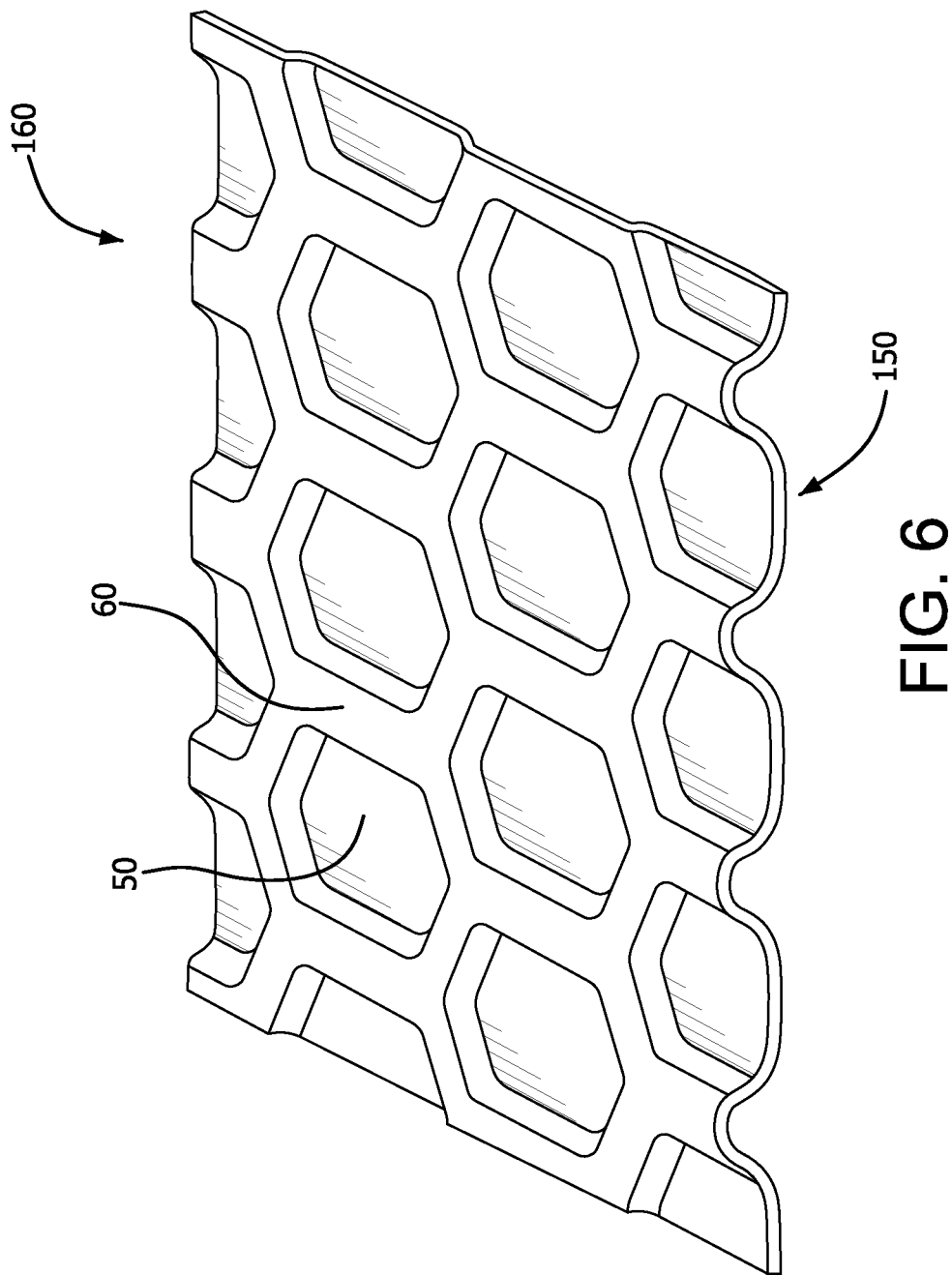
FIG. 6 is a perspective view of a three-dimensional laminate according to at least one exemplary embodiment of the invention.

In one or more exemplary embodiment, the film layer 20 and/or the first textile 40 is elastic or can otherwise be manipulated to change dimensions (e.g., shrink or elongate). In the instance where the first textile 40 is elastic, raised, visible portions of the laminate corresponding to the unbonded regions 60 are visible as depicted in FIG. 6. The raised, visible pattern outlines the geometric or abstract shape formed by adhesive 30. In addition, the bonded regions 50 exhibit a localized curling phenomenon 150. It was unexpectedly discovered that the unbonded regions 60 not only relieve the residual stresses in the laminate, they also allow for the introduction of stress (e.g., curl) in the bonded regions 50 without causing excessive curl in the overall laminate 160. The localized, aggressive curl 150 in the bonded regions 50, separated by flexible unbonded regions 60, increases the three-dimensional aspect of the laminate 160 and introduces increased performance and/or characteristics, such as, but not limited to increased insulative properties, stretch, spectral properties, and aesthetic characteristics.

The thermal resistance per unit mass of the laminates (e.g. insulative property) of the invention may be greater than or equal to 0.05 $(m^2K/W)/(kg/m^2)$. In at least one exemplary embodiment, the thermal resistance per unit mass of the laminates is from 0.05 $(m^2K/W)/(kg/m^2)$ to about 0.4 $(m^2K/W)/(kg/m^2)$. The radius of curvature in the bonded regions 50 may be less than about 50 mm, less than about 20 mm, less than about 10 mm, or less than about 6 mm. In addition, the radius of curvature may be greater than about 1 mm, greater than about 2 mm, greater than about 3 mm or even greater. In exemplary embodiments, the radius of curvature ranges from about 2 mm to about 50 mm, from about 3 mm to about 20 mm, or from about 4 mm to about 10 mm. Also, the laminate may have a thickness to weight per unit area greater than about 0.005 $mm/(g/m^2)$, greater than about 0.010 $mm/(g/m^2)$, or greater.

Figure 7:
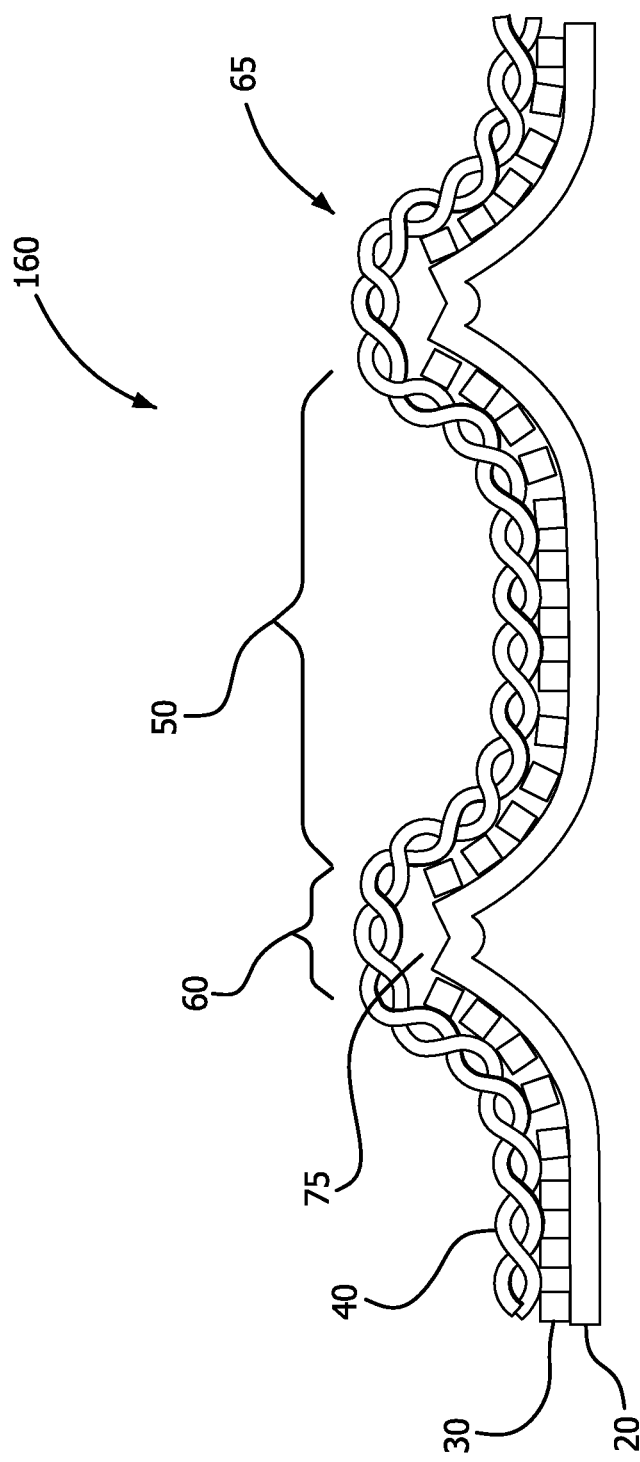
FIG. 7 is a schematic illustration of a two-layer laminate having discontinuous adhesive dots in the bonded regions and raised portions corresponding to the unbonded regions according to one embodiment of the invention.

Turning now to FIG. 7, the three-dimensional laminate 160 according to at least one exemplary embodiment can best be seen. To form the laminate 160, the first textile 40 is stretched a predetermined distance and adhesive 30 is applied to the film layer 20 in an unstretched, relaxed state. It is to be understood that although the first textile 40 (and film layer 20 discussed below) is discussed herein as being stretched in one direction, bi-axially stretching the textile (and film) is considered to be within the scope of the invention. As discussed in detail above, adhesive 30 is applied in a discontinuous manner to provide bonded regions 50 and unbonded regions 60. While the first textile 40 is tensioned in a stretched position, the film layer 20 containing adhesive 30 is positioned on the first textile 40 to bond the film layer 20 to the first textile 40. Upon the release of tension, the first textile 40 returns to approximately its original, unstretched position. In exemplary embodiments, adhesive 30 is cured prior to the release of tension.

As the first textile 40 relaxes ("unstretches"), the bonded regions 50 curl and the unbonded regions 60 rise. The laminate 160 buckles (e.g., bunches) in the unbonded regions 60 due, at least in part, to the absence or substantial absence of adhesive in the unbonded regions 60 compared to the bonded regions 50. The terms "buckle" and "bunch" may be used interchangeably herein and are meant to denote the bending of the film layer or textile layer upon itself to form the raised portions 65. The difference in the presence of adhesive in the bonded regions 50 and the unbonded regions 60 permits the laminate to rise (relax) in the unbonded regions 60 and curl in the bonded regions 50. The concave surface of the bonded regions 50 is positioned toward the textile side of the laminate. Further, the buckling of the unbonded regions 60 forms an air gap 75 located between the first textile 40 and the film layer 20 where the first textile 40 is unbonded to the film layer 20. The laminate 160 (and laminate 170 described below) is capable of preferentially bending in the unbonded regions 60, which are free or substantially free of adhesive. This preferential bending is due, at least in part, to the fact that the laminate has a lower bending modulus in the unbonded regions 60 compared to the bending modulus in the bonded regions 50. In at least one exemplary embodiment, the bending modulus in the unbonded regions is at least 20% less, at least 30% less, at least 40% less, or at least 50% less (or even less) than the bending modulus of the bonded regions.

Figure 8:
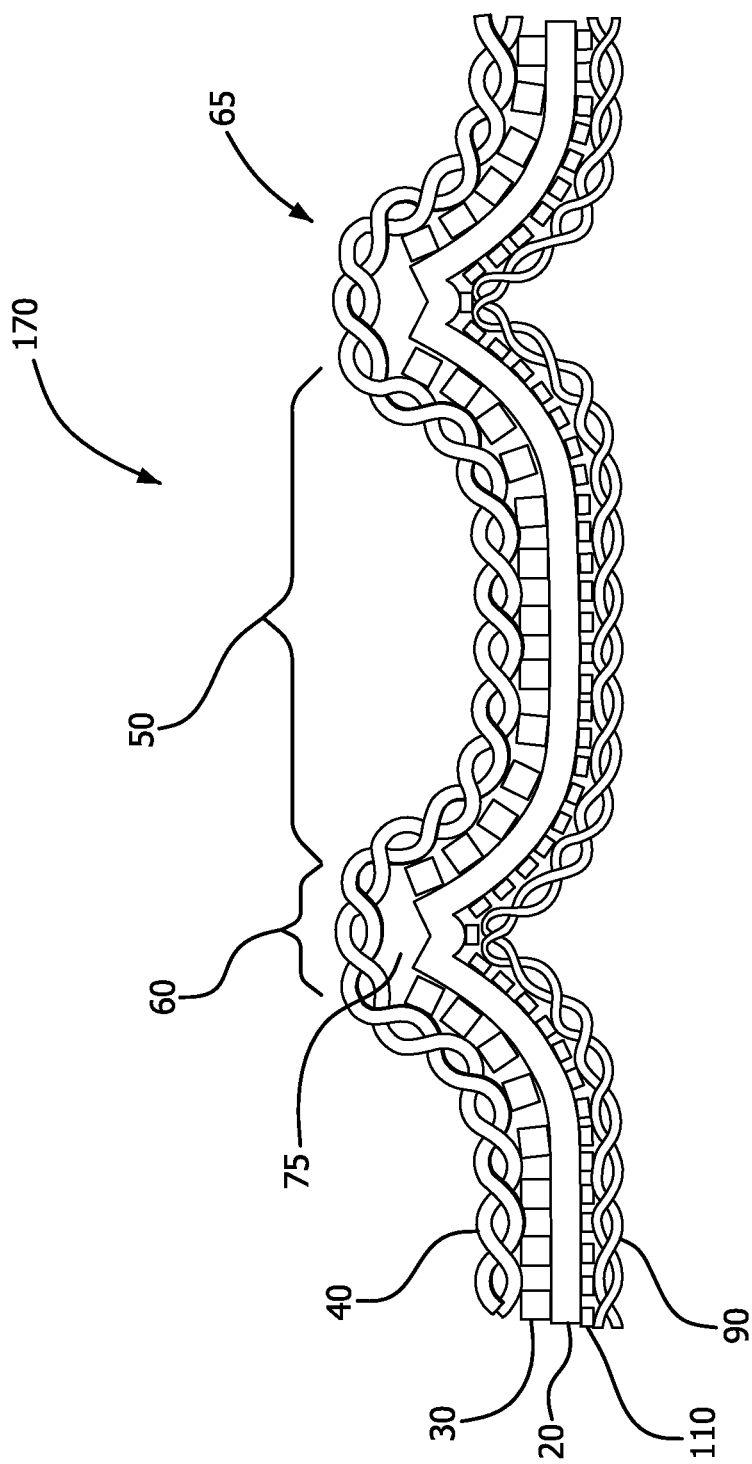
FIG. 8 is a schematic illustration of a three-layer laminate having discontinuous adhesive dots in the bonded regions and raised portions corresponding to the unbonded regions according to at least one exemplary embodiment of the invention.

A second textile 90 may be bonded to the film layer 20 by adhesive 110 as shown in FIG. 8. In this embodiment, the second textile 90 is affixed to the film layer 20 while the first textile 40 is in the stretched position described above. As a result, the second textile 90 is positioned in a substantially planar orientation to the film layer 20. In other words, the second textile 90 substantially follows the path of the film layer 20 and buckles with the film layer 20 in the unbonded regions 60 and curls with the first textile 40 in the bonded regions 50 when the first textile 40 is released from tension. It is to be noted that the addition of the second textile 90 does not prohibit the buckling of the film layer 20 in the unbonded regions 60 or the curling of the laminate in the bonded regions 50 to form the three dimensional structure of the laminate. Although not depicted in FIG. 8, the adhesive 110 may be applied in a discontinuous manner to provide bonded and unbonded areas on both the top and bottom surface of laminate 170. In addition, the first textile 40 in the raised portions 65 may be at least partially coated with an abrasion resistant coating, such as a polymer coating, (not illustrated) to protect the first textile 40 (e.g., outer surface) from wear, such as, for example, when the laminate is used to construct a garment.

Figure 9:
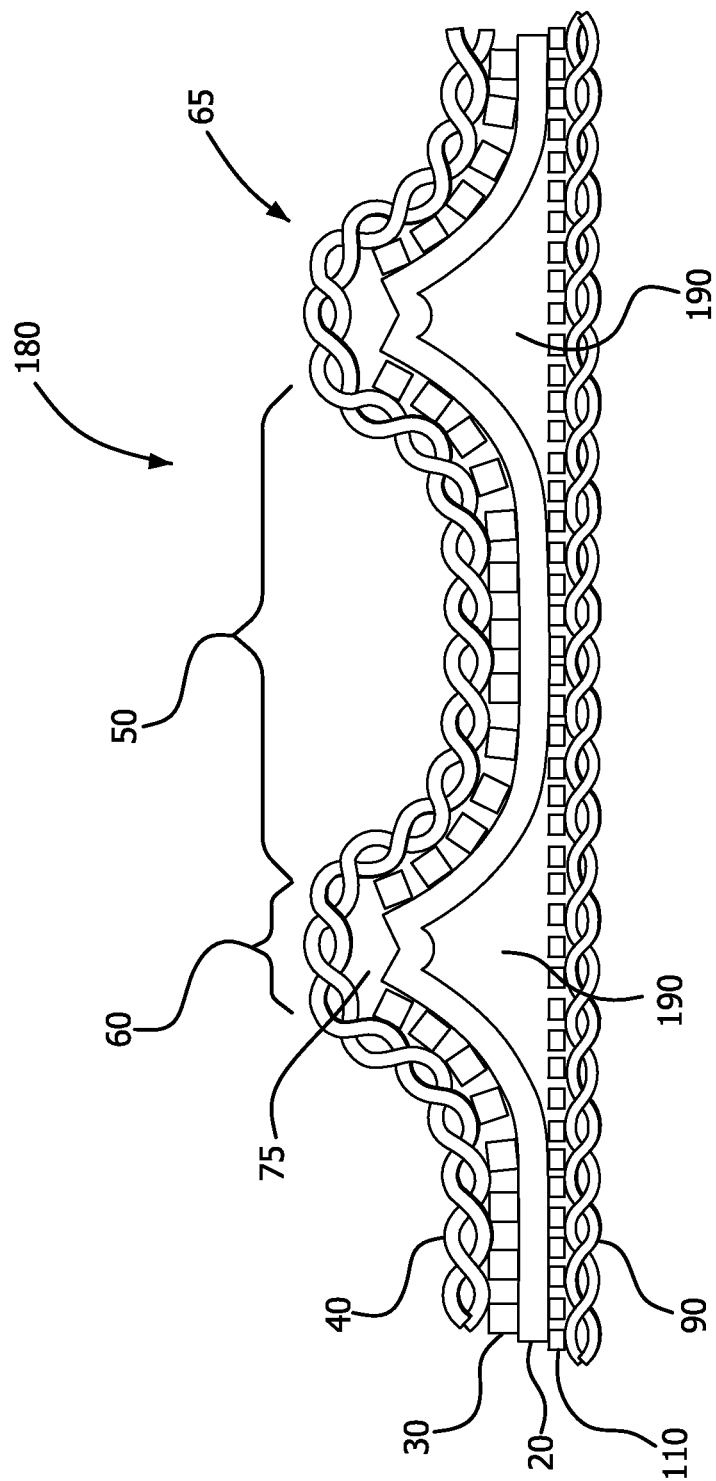
FIG. 9 is a schematic illustration of a three-layer laminate where the second textile forms air pockets within the laminate according to another exemplary embodiment of the invention.

In an alternate embodiment depicted in FIG. 9, the second textile 90 is bonded to laminate 160 after the first textile 40 is released from tension and laminate 160 has curled in the bonded regions 50. Adhesive 110 may be applied in a discontinuous manner substantially across the length of the second textile 90 as shown. Alternatively, adhesive 110 may be applied in a continuous manner across the second textile 90 or in discrete portions (either continuously or discontinuously) on only the portion of the laminate 180 where the second textile 90 is in contact with the film layer 20. As can be seen in FIG. 9, the second textile layer 90 is substantially flat relative to the film layer 20 and first textile 30. By affixing the second textile 90 to the film layer 20 in this manner, air pockets 190 are formed in the areas defined between the second textile 90 and the film layer 20. These air pockets 190 provide additional insulation value to the laminate 180.

Figure 10:
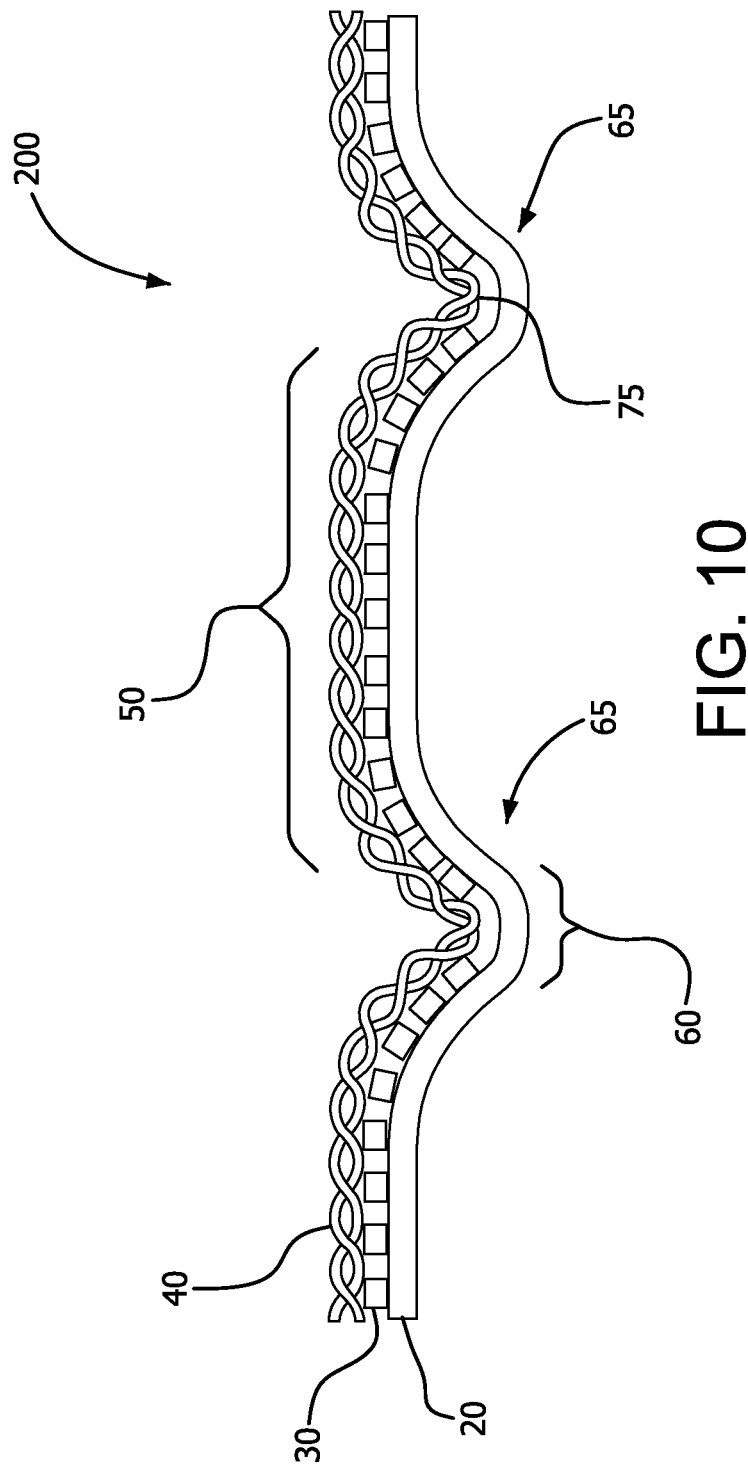
FIG. 10 is a schematic illustration of a laminate structure formed with a shrinkable or elastic film layer according to at least one exemplary embodiment of the invention.

In a further embodiment, the film layer 20 may be either elastic or shrinkable. Looking at FIG. 10, the film layer 20 is bonded to the first textile 40 with a discontinuous adhesive 30 that forms a patterned surface on the laminate 200. In an embodiment where the film layer 20 is elastic, the raised portions 65 in the unbonded regions 60 and curling in the bonded regions 50 are achieved by applying a first textile 40 having thereon adhesive 30 to a tensioned film layer 20. When the tension is released, the laminate curls in the bonded regions 50 toward the film layer 20. Here, the concave surface of the bonded regions 50 is positioned towards the film layer side of the laminate. As discussed above, the difference in the presence of adhesive in the bonded regions 50 and the unbonded regions 60 allows the laminate to rise (relax) in the unbonded regions 60 and curl in the bonded regions 50. Additionally, an air gap 75 is formed between the second textile 40 and the film layer 20 in the raised regions 65. In addition, the curled areas corresponding to the bonded regions 50 may be at least partially coated with an abrasion resistant coating, such as a polymer coating, (not illustrated) to protect the first textile 40 (e.g., outer surface) from wear, such as, for example, when the laminate is used to construct a garment.

Alternatively, where the film layer 20 is shrinkable, the raised portions 65 in the unbonded regions 60 and the curling in the bonded regions 50 are achieved by shrinking the film layer 20, such as by applying heat to the film layer 20. As the film layer 20 shrinks, the laminate 200 curls in the bonded regions 50 toward the film layer 20. The laminate 200 relaxes (rises) in the unbonded regions 60 to relieve the stress caused from shrinking the film layer 20. It is to be understood that both a stretchable (i.e., elastic) and shrinkable film layer 20 result in the two-layer laminate 200 depicted in FIG. 10. In embodiments where the film layer 20 is shrinkable or stretchable, the first and second textiles 40, 90 are not particularly limited, and may both be inelastic.

Alternatively, where the first textile 40 is shrinkable, the raised portions 65 in the unbonded regions 60 and the curling in the bonded regions 50 are achieved by shrinking the first textile layer 40, such as by applying heat to the first textile layer 40. As the textile layer 40 shrinks, the laminate curls in the bonded regions 50 toward the textile layer 40. The laminate relaxes (rises) in the unbonded regions 60 to relieve the stress caused from shrinking the textile layer 40. In embodiments where the textile layer 40 is shrinkable or stretchable, the film layer 20 and second textile 90 are not particularly limited, and one or both may be inelastic.

Figure 11:
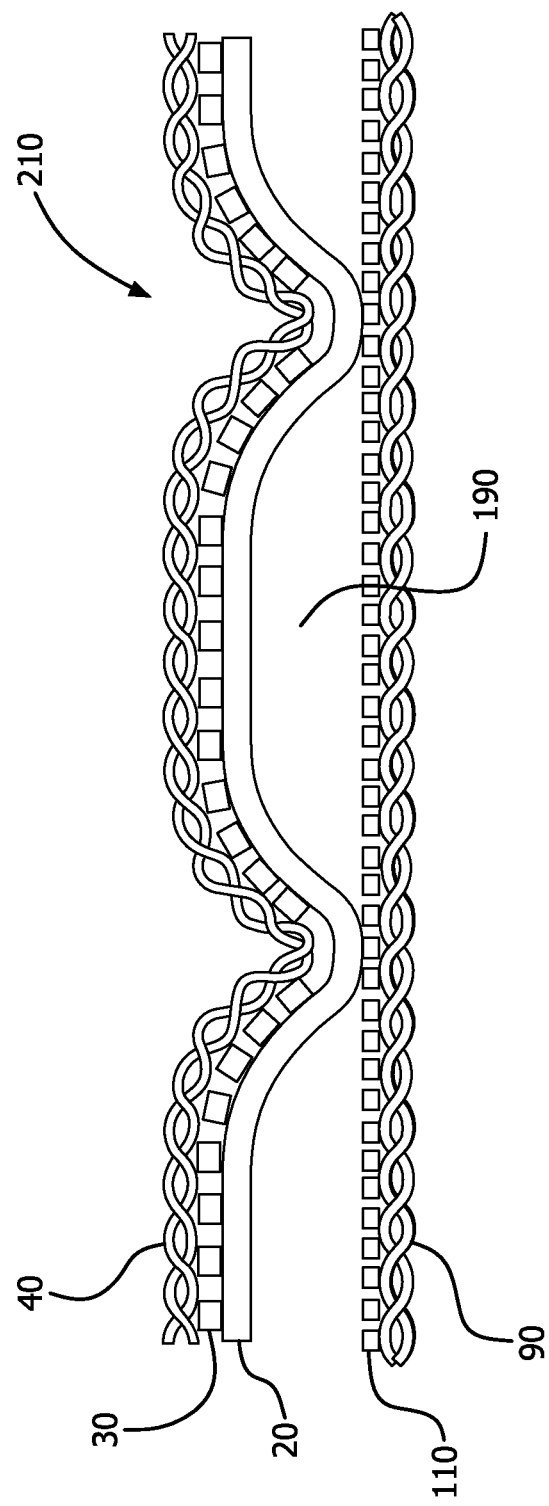
FIG. 11 is a schematic illustration of the laminate of FIG. 10 with a second textile positioned on the film layer opposite the first textile according to one embodiment of the invention.

A second textile 90 may be affixed to the film layer 20, such as is depicted in FIG. 11. It is to be appreciated that adhesive 110 may be applied in a discontinuous manner as shown, or it may be applied in discrete portions (either continuously or discontinuously) on only the portion of the laminate 210 where the second textile 90 is in contact with the film layer 20. In the embodiment depicted in FIG. 11, the addition of the second textile 90 forms air pockets 190 in the areas defined between the film layer 20 and the second textile 90.

It is to be appreciated that the above-described embodiments are non-limiting as the three-dimensional nature of the laminate may be achieved by providing at least one layer that is deformable in some manner, such as, for example, by being elastic, by being shrinkable, by being expandable, or any combination thereof. The deformation of one of the layers creates stress within the laminate that causes curling of the laminate within the bonded regions. In turn, the unbonded regions allow the laminate to buckle, which relieves the stress caused by the curling of the laminate. The laminates described herein are considerably quieter in use compared to conventional laminates at least partially due to the preferential bending of the laminate within the unbonded regions.

The laminates described herein may be used in a variety of applications, such as, for example, in garments, as insulation, as spacer material, in diffuse reflective surfaces, or anywhere else that a highly texturized laminate may be used. The advantages of the invention as described herein are numerous, ranging from reduced stiffness and noise to improved insulation and aesthetic differentiation and improved or enhanced spectral reflection. Spectral reflection is improved or enhanced, at least in part, by the topography (e.g., raised portions) of the inventive articles.

Laminates having a reduction in noise may be used in applications where noise control is crucial, such as hunting, law enforcement or military, as well applications where noise control is merely desirable, such as consumer outdoor garments (e.g., jackets, pants, etc.). Embodiments which utilize laminate curling include light-weight insulative garments for consumers, fire-fighters, and the like, or reduced contact area blankets and sheets for medical applications.

Testing Methods

It should be understood that although certain methods and equipment are described below, any method or equipment determined suitable by one of ordinary skill in the art may be utilized.

Suter Test for Liquid-proof Fabrics

The Suter Test Method was used to determine if a sample was liquid-proof. This procedure is based generally on the description in ASTM D 751-00, Standard Test Methods for Coated Fabrics (Hydrostatic Resistance Procedure B2). This procedure provides a low pressure challenge to the sample being tested by forcing water against one side of the test sample and observing the other side for indication that water has penetrated through the sample.

The test sample was clamped and sealed between rubber gaskets in a fixture that held the sample so that water could be applied to a specific area. The circular area to which water was applied was 4.25 inches in diameter. The water was applied at a pressure of 1 psig (0.07 bar) to one side of the sample. In testing laminates with one textile layer the pressurized water was incident upon the film side.

The unpressurized side of the sample was observed visually for any sign of water appearing for 3 minutes. If no water was observed the sample was deemed to have passed the test and was considered liquid-proof. The reported values were the average of three measurements.

Water Vapor Transmission Rate (WVTR) Test

Water Vapor Transmission Rate (WVTR), i.e. water-vapor-permeability, is measured by placing approximately 70 ml of a solution consisting of 35 parts by weight of potassium acetate and 15 parts by weight of distilled water into a 133 ml polypropylene cup having an inside diameter of 6.5 cm at its mouth. An ePTFE membrane having a minimum WVTR of approximately 85,000 g/m$^2$/day (as tested by the method described in U.S. Pat. No. 4,862,730 to Crosby) was heat sealed to the lip of the cup to create a taut, leak-proof, microporous barrier containing the solution.

A similar ePTFE membrane was mounted to the surface of a water bath. The water bath assembly was controlled at 23° C.±0.2° C., utilizing a temperature controlled room and a water circulating bath. The sample to be tested was allowed to condition at a temperature of 23° C. and a relative humidity of about 50% prior to performing the test procedure. Three samples were placed so that each sample to be tested was in contact with the expanded PTFE membrane mounted over the surface of the water bath and was allowed to equilibrate for at least 15 minutes prior to the introduction of the cup assembly.

The cup assembly was weighed to the nearest 0.001 g and was inverted onto the center of the text sample. Water transport was provided by the driving force between the water in the water bath and the saturated salt solution providing water flux by diffusion in that direction. The sample was tested for 20 minutes and the cup assembly was then removed and weighed again to within 0.001 g.

The WVTR of the sample was calculated from the weight gain of the cup assembly and was expressed in grams of water per square meter of sample surface area per 24 hours. The reported values were the average of three measurements.

Thermal Conductivity Measurement

Thermal conductivity of samples of the present invention was measured using a custom-made heat flow meter thermal, conductivity tester at atmospheric conditions (about 298 K and 101.3 kPa). The tester consisted of a heated aluminum plate with a heat flow sensor (Model FR-025-TH44033, commercially available from Concept Engineering, Old Saybrook, Conn.) and a temperature sensor (thermistor) imbedded in its surface, and a second aluminum plate maintained at room temperature, also with a temperature sensor imbedded in its surface.

The temperature of the heated plate was maintained at 309.15 K while the temperature of the "cold" plate was kept at 298.15 K. The diameter of the plates was about 10 cm. The heat flow measurement was normally obtained within about two to five minutes after the sample was placed in the tester upon reaching a steady state.

Thermal resistance per unit mass was calculated from the measured heat flow and the sample weight according to the formula $R_m$ (1/Q−1/Q(0))/w, where $R_m$ is thermal resistance per unit mass in $(m^2K/W)/(kg/m^2)$, Q is normalized heat flow in $W/m^2K$, Q(0) is normalized heat flow with no sample in place (Q(0)=100 $W/m^2K$), and w is sample weight in $kg/m^2$. The reported values represent the average of three measurements.

Radius of Curvature Measurement

Figure 16:
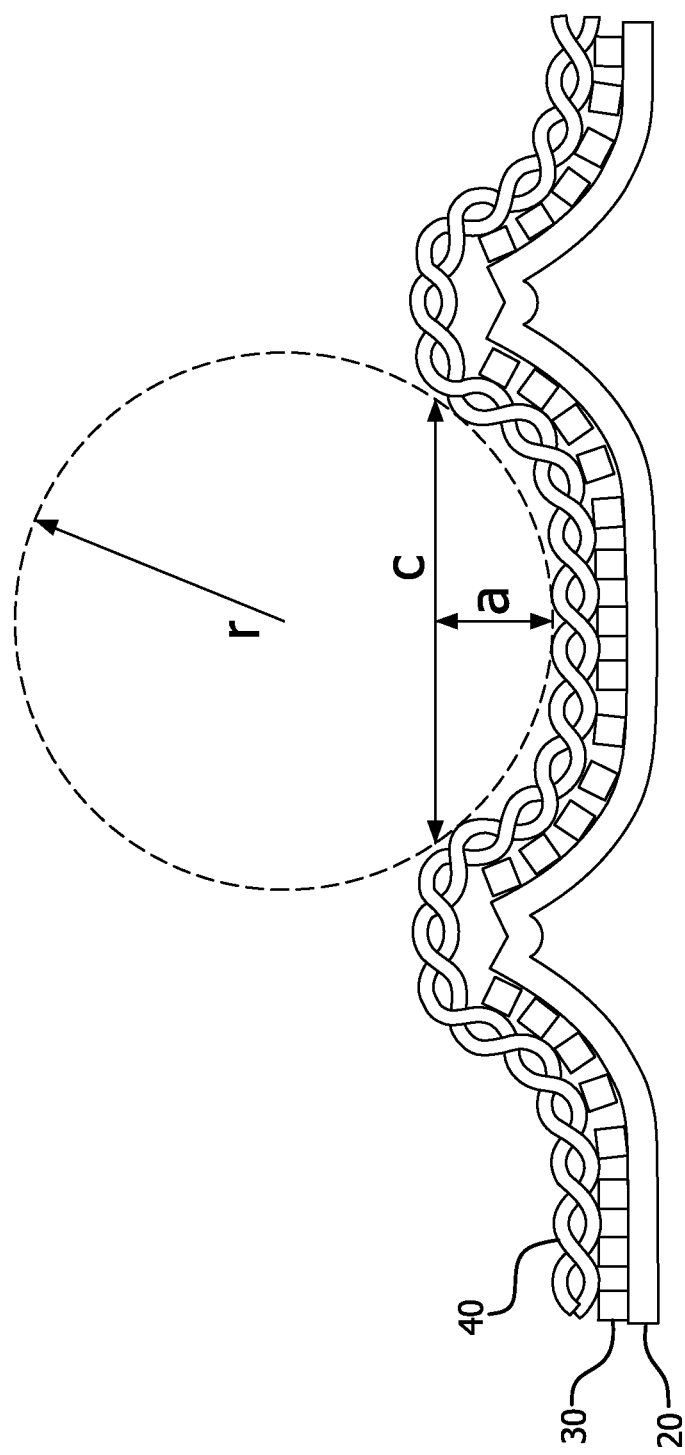
FIG. 16 is a schematic illustration of a method for determining the radius of curvature of the laminate of FIG. 7.

The radius of curvature is defined as the radius of the largest circle that can touch both the top edges and the bottom center of a cross-section of a curled region, as shown in FIG. 16. To determine this, the sample was cut perpendicular to the radius of curvature such that the cut bisected several curled sections. The width and the depth of the curled sections were then measured with digital calipers and average values were obtained.

The radius of curvature was calculated from the average width and depth measurements according to the formula: $r=c^2/(8*a)+(a/2)$, where r is the radius of curvature in mm, c is the width of the curled section in mm and a is the depth of the curled section in rm. The reported values were the average of three measurements.

Bending Modulus Measurement

The bending modulus of a 4.68 mm×4.68 mm sample of laminate of the present invention was measured using a Thermomechanical Analyzer (Model Q400 from TA Instruments, New Castle, Del.) using a 3-point bend method. The test was performed at 23° C. The support span was 2.508 mm. The deflection rate was approximately 0.162 mm per minute. The samples were placed in the test apparatus with the face fabric facing up.

The modulus of each sample was calculated according to the formula $E_r=L^3 m/(4 bd^3)$, where $E_r$ is the bending modulus in MPa, L is the support span in mm, m is the slope of the initial straight-line portion of the load-deflection curve in N/mm, b is the width of the test sample in mm, and d is the thickness of the test sample in mm. Sample thickness was measured using a digital micrometer (Model ID-C112EX from Mitutoyo Corp, Kawasaki, Japan).

Six samples from each region were tested, three in the machine (warp) direction and three in the transverse (weft) direction. The reported values represent the average of all six measurements.

Maximum Thickness to Weight Per Area Ratio Measurement

The maximum thickness of the samples was measured using a digital micrometer (Model XLI 40002, Mahr Federal Inc., Providence, R.I.) between two rigid surfaces with an area of 5 $cm^2$. It is to be noted that any suitable means for measuring the maximum thickness (i.e., the height of the raised regions) and area can be used. The sample weight was determined by cutting a circular portion of the sample 8.9 cm in diameter and weighing it to the nearest 0.001 g. The thickness to weight ratio was calculated according to the equation D=T/(W/A), where D is the thickness to weight ratio in mm/$(g/m^2)$, T is sample thickness in mm, W is sample weight in g, and A is the area in $m^2$. The reported values represent the average of three measurements.

Stretch Force Measurement

The force to stretch of the samples was measured using an Instron universal testing machine (Model 5565) with a 1000-lb load cell. A 3-inch by 8-inch sample of material was cut with the long dimension oriented in the direction of maximum stretch, A horizontal bar 5 mm in diameter was attached to the load cell of the Instron and pneumatic clamps were attached to the Instron base. The top edge of the horizontal bar was positioned 3" above the top of the pneumatic clamp grips. The sample was folded in half parallel to the 3-inch sides and was placed over the horizontal bar. The ends of the sample were clamped together in the pneumatic clamp grips such that there was neither tension nor slack in the sample. The sample was stretched at a strain rate of 10 inches/minute and the load at 20% strain was recorded in lbf. The reported values represent the average of three measurements.

It would be apparent to one of skill in the art that the laminate may be separated into its component parts by any suitable means, which may include, but is not limited to, dissolving the adhesive with an appropriate solvent. The stretch force of the textile may then be determined.

Thickness

Thickness was measured by placing the membrane or textile laminate between the two plates of a Mitutoyo 543-252BS Snap Gauge. The average of the three measurements was used.

Matrix Tensile Strength (MTS)

Maximum load was measured using an INSTRON 1122 tensile test machine equipped with flat-faced grips and a 0.445 kN load cell. The gauge length was 5.08 cm and the cross-head speed was 50.8 cm/min. The sample dimensions were 2.54 cm by 15.24 cm. To ensure comparable results, the laboratory temperature was maintained between 68° F. and 72° F. to ensure comparable results. Data was discarded if the sample broke at the grip interface.

For longitudinal MTS calculations, the larger dimension of the sample was oriented in the machine, or "down web," direction. For the transverse MTS calculations, the larger dimension of the sample was oriented perpendicular to the machine direction, also known as the "cross web" direction. Each sample was weighed using a Mettler Toledo Scale Model AG204. The thickness of the samples was then measured using a Kafer FZ1000/30 snap gauge. The samples were then tested individually on the tensile tester. Three different sections of each sample were measured. The average of the three maximum load (i.e., the peak force) measurements was used.

The longitudinal and transverse MTS were calculated using the following equation:

MTS=(maximum load/cross-section area)*(bulk density of PTFE)/density of the porous membrane), wherein the bulk density of PTFE is taken to be 2.2 g/cc.

The average of three cross-web measurements was recorded as the longitudinal and transverse MTS.

Density

To calculate density, measurements from the Matrix Tensile Testing were used. As mentioned above, the sample dimensions were 2.54 cm by 15.24 cm. Each sample was weighed using a Mettler Toledo Scale Model AG204 and then the thickness of the samples was taken using a Kafer FZ1000/30 snap gauge. Using this data, a density of the sample can be calculated with the following formula:

$$\rho = \frac{m}{w*l*t}$$

where: $\rho$=density (g/cc)
m=mass (g)
w=width (1.5 cm)
l=length (16.5 cm)
t=thickness (cm)

The reported results are the average of 6 calculations.

Bubble Point Pressure

A bubble point test was run according to the general teaching of ASTM F31 6-03. The bubble point is considered the lowest pressure at which a continuous stream of bubbles were observed rising from the sample. An opaque or white membrane sample was wet with a wetting liquid such as isopropyl alcohol (IPA) until the sample became transparent or translucent. The membrane sample was placed into a filter holder to secure the sample, and an additional amount of IPA was added to the holder. A first side of the sample was subjected to increasing gas pressure while the second side of the sample was visually monitored with the unaided eye as the gas pressure was increased. As the gas pressure of the fixture approaches the bubble point pressure, small gas bubbles are observed forming on the top face of the sample. As the pressure is further increased, the gas bubbles begin to stream up from the top surface of the ePTFE membrane, and the pressure at that point is recorded as the Bubble Point Pressure. The reported results are the average 3 measurements.

Having generally described this invention, a further understanding can be obtained by reference to certain specific examples illustrated below which are provided for purposes of illustration only and are not intended to be all inclusive or limiting unless otherwise specified.

EXAMPLES

Example 1

A length of 129 g/m² nylon/Roica® stretch woven material (Style GNS3 from Formosa Taffeta Co., Touliu, Taiwan) and a length of polyurethane-coated ePTFE were obtained. The ePTFE had the following properties: thickness=0.043 mm, density=0.41 g/cc, matrix tensile strength in the length direction=$31\times10^6$ MPa, matrix tensile strength in the width direction=$93\times10^6$ MPa, Bubble Point=$1.5\times10^5$ MPa. Polyurethane (PU) was applied by coating the ePTFE membrane and allowing it to at least partially penetrate the pores of the membrane, then cured.

Figure 12:
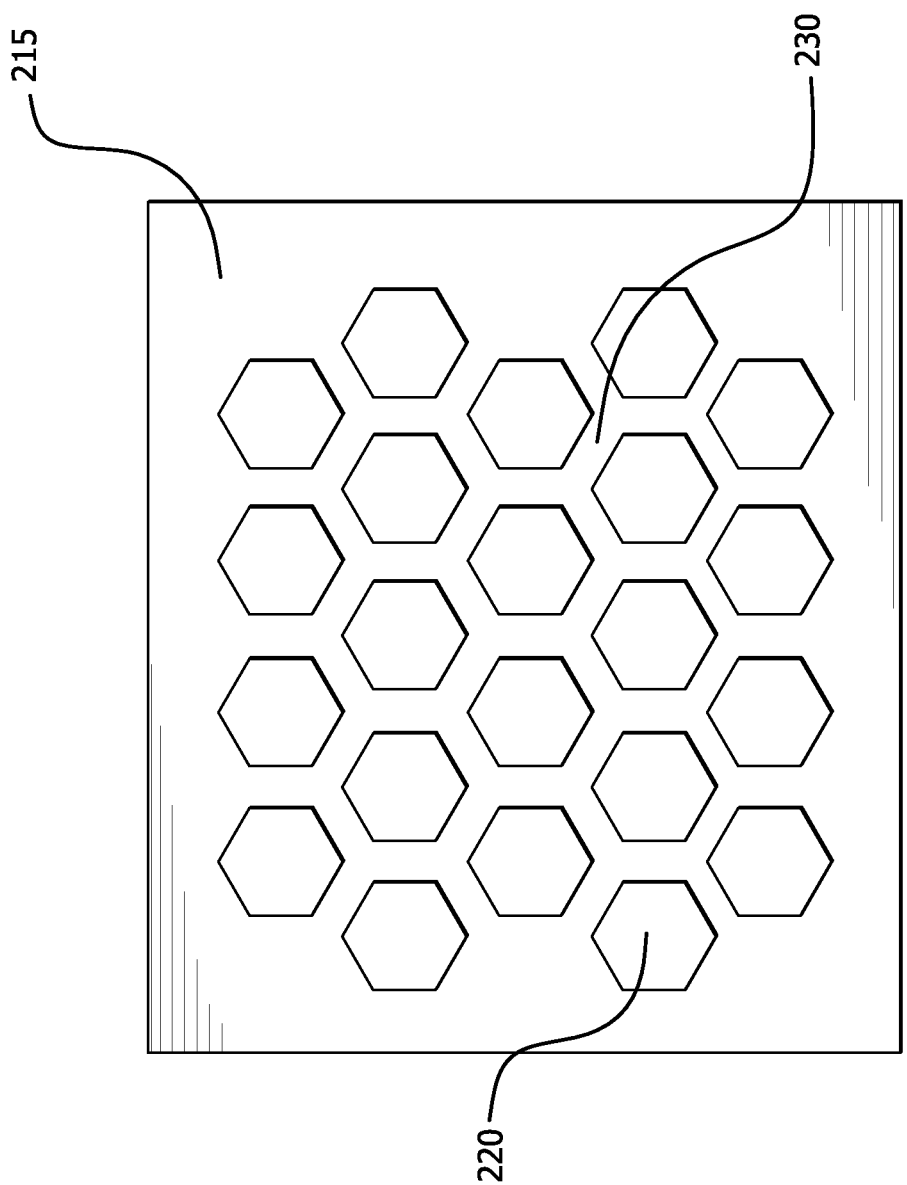
FIG. 12 is a schematic illustration of a release paper having therein a hexagonal pattern according to one exemplary embodiment of the invention.
Figure 17:
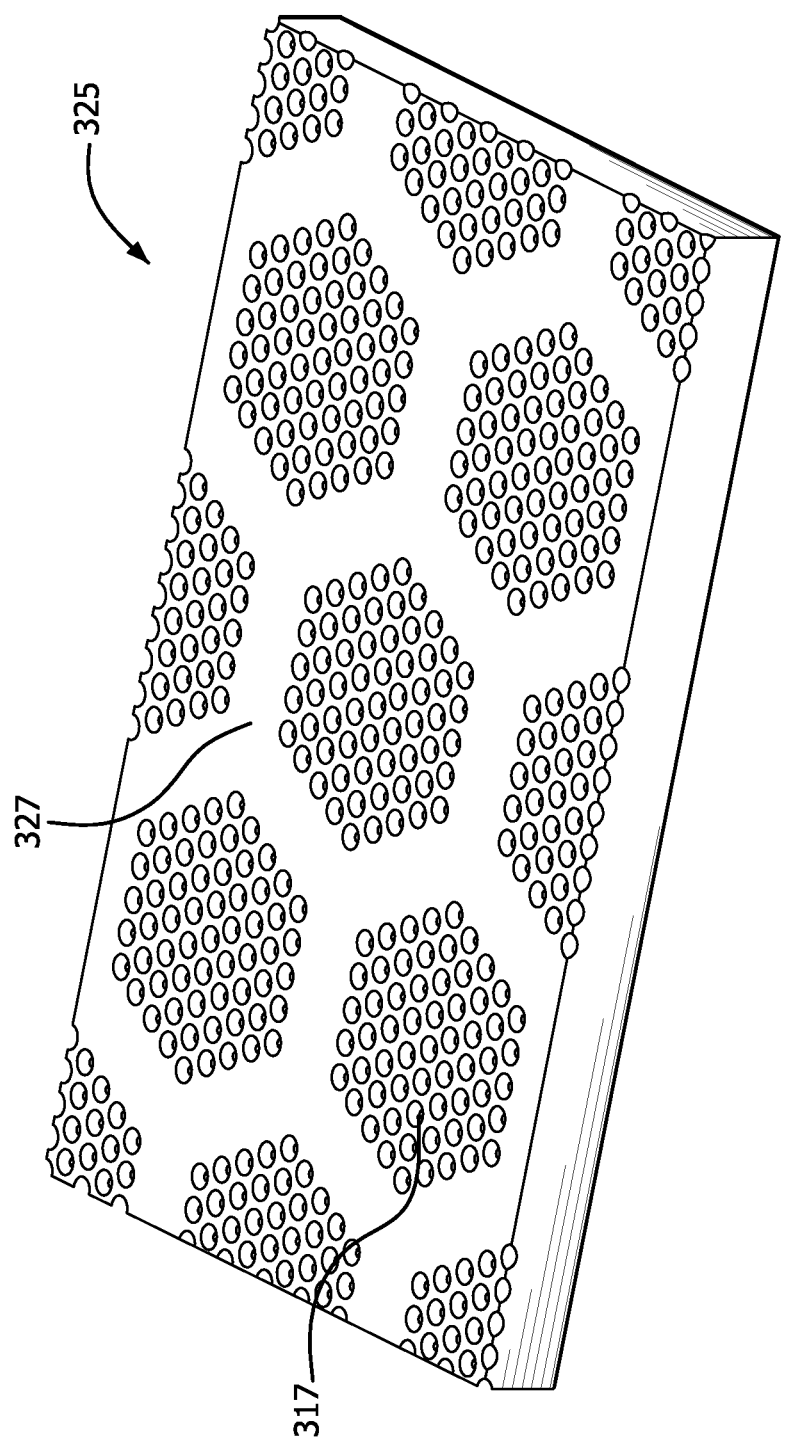
FIG. 17 is a schematic illustration of a portion of a gravure roll containing an adhesive pattern separated by non-adhesive areas according to one embodiment of the invention.
Figure 18:
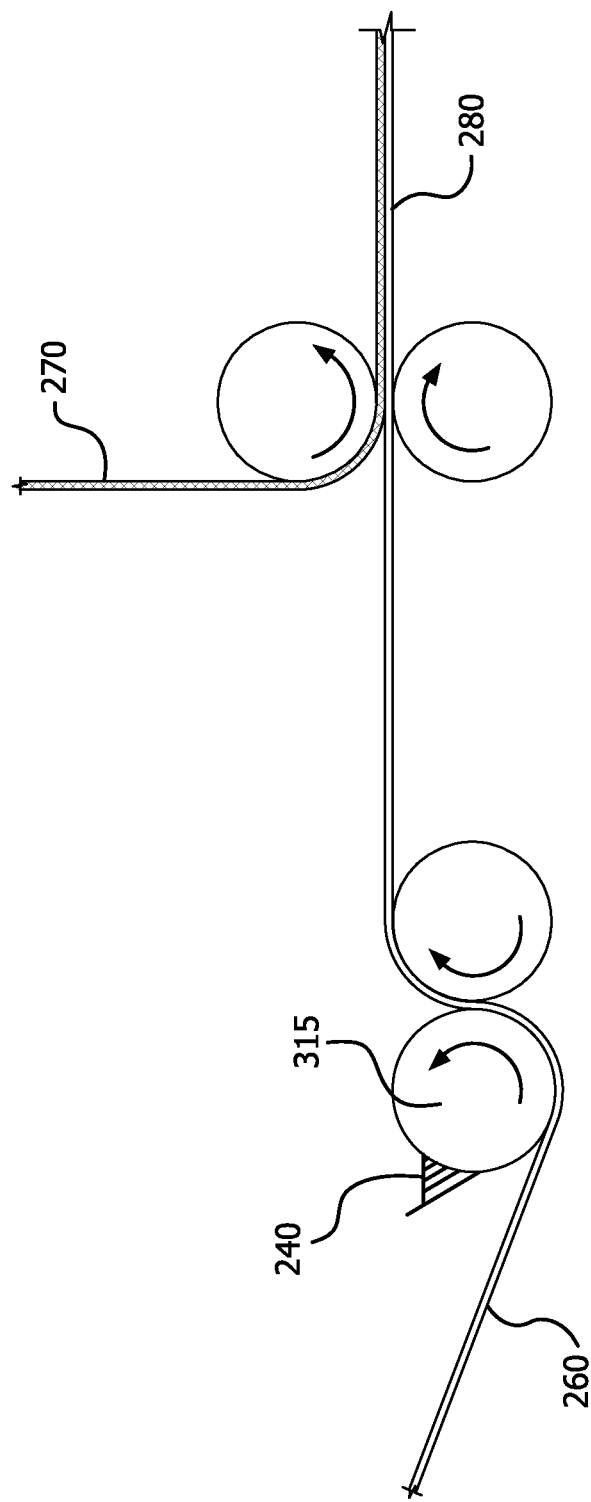
FIG. 18 is a schematic illustration of a process for forming a two-layered laminate using a gravure roll to apply an adhesive pattern according to at least one exemplary embodiment of the invention.

A release paper 215 was laser cut using the honeycomb (hexagonal) pattern shown in FIG. 12. The hexagonal voids 220 were cut 10 mm wide and were separated by 4 mm wide strips of release paper 230. The release paper was positioned onto the ePTFE side of the coated membrane and the release paper plus membrane were fed into the gravure printer. Although not utilized in this example, in an alternative embodiment shown in FIG. 17, a gravure roll 315 having thereon the applied adhesive pattern (shown generally as reference numeral 317 in FIG. 18) may transfer the adhesive to the functional film layer (e.g., coated membrane), thus eliminating the need for release paper 215. A portion 325 of the gravure roll 325 is depicted in FIG. 18 and contains both the adhesive pattern 317 and non-adhesive areas 327.

Figure 13:
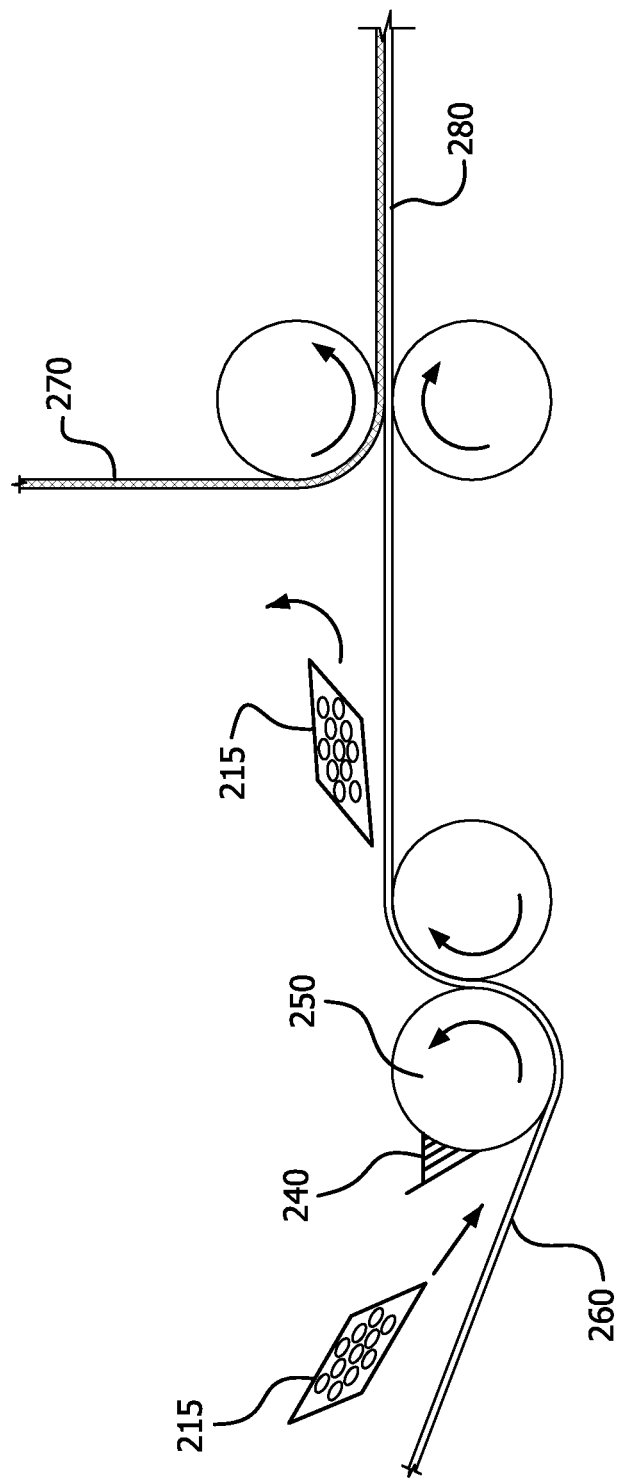
FIG. 13 is a schematic illustration of a process for forming a two-layered laminate using release paper to apply a hexagonal adhesive pattern according to at least one exemplary embodiment of the invention.

Turning now to FIG. 13, a portion of the processing line for forming a two-layer laminate can be seen. Another polyurethane 240 was obtained and loaded in the printer in order to apply heated adhesive dots to the ePTFE side of the membrane via roll 250. 500 micron diameter dots were applied at a percent area coverage of 39% to the unmasked area of the ePTFE membrane 260. As used herein, the term "percent area coverage" of adhesive is meant to denote the total two-dimensional area of adhesive in a given region divided by the area of that region, multiplied by 100%. The stretch woven material was tensioned, the release paper 215 (mask) was removed, and the stretch woven textile 270 was placed onto the adhesive side of the membrane 260. While retaining the tension on the textile 270, the resulting laminate 280 was spooled onto a roll (not shown) and allowed to moisture cure, which required approximately 2 days.

Following moisture curing, the laminate was unspooled and allowed to relax, thereby returning to the initial, untensioned state of the textile. The hexagonal pattern was visible by the naked eye. The sample exhibited localized curling in the areas corresponding to the hexagonal voids in the release paper. The concave surface of these areas was towards the textile side of the laminate.

The width of the curled sections was 7.3 mm, the depth was 0.9 mm, and the radius of curvature was 7.8 mm. The resulting laminate weighed 173 g/m². The water vapor transmission rate of the sample was 10,048 g/m²/24 h. The sample was liquid-proof and breathable. The thermal resistance per unit mass of the laminate was 0.090 (m²K/W)/(kg/m²). The thickness to weight per area ratio of the sample was 0.0051 mm/(g/m²).

Example 2

Another laminate was created as described generally in Example 1 with the following exceptions. The textile was a 93.2 g/m² nylon woven (Style 131913 from Milliken, Spartanburg, S.C.), the hexagonal voids in the release paper were 30 mm wide and were separated by strips of release paper 6 mm wide, the textile was not pre-stretched, additional adhesive dots were also applied to the coated side of the ePTFE, and a third layer of textile, a 37.3 g/m² polyester knit (Style A1012 from Glen Raven, Glen Raven, N.C.) was added to the adhesive on the side opposing the nylon woven textile.

The resulting laminate weighed 180 g/m². The water vapor transmission rate of the sample was 7,069 g/m²/24 h. The sample was liquid-proof and breathable. The thermal resistance per unit mass of the laminate was 0.024 (m²K/W)/(kg/m²). The thickness to weight per area ratio of the sample was 0.0021 mm/(g/m²). The bending modulus in the bonded regions was 11.3 MPa. The bending modulus in the unbonded regions was 2.40 MPa.

Example 3

A length of 49.0 g/m² nylon woven material (Style 131907 from Milliken, Spartanburg, S.C.) and a length of ePTFE membrane were obtained. The ePTFE had the following properties: thickness=0.126 mm, density=0.402 g/cc, matrix tensile strength in the length direction=28.5×10⁶ Pa, matrix tensile strength in the width direction=144.3×10⁶ Pa, Bubble Point=9.55×10⁴ Pa. The ePTFE membrane was laminated to a 25.4 micron thick, monolithic, thermoplastic polyurethane film (part number PT1710S from Deerfield Urethane, South Deerfield, Ma) using a continuous layer of breathable polyurethane adhesive applied at a coverage rate of 12 to 15 g/m². The breathable polyurethane adhesive was a moisture-cured polyether polyurethane adhesive, as described in U.S. Pat. No. 4,532,316 to Robert Henn.

Figure 14:
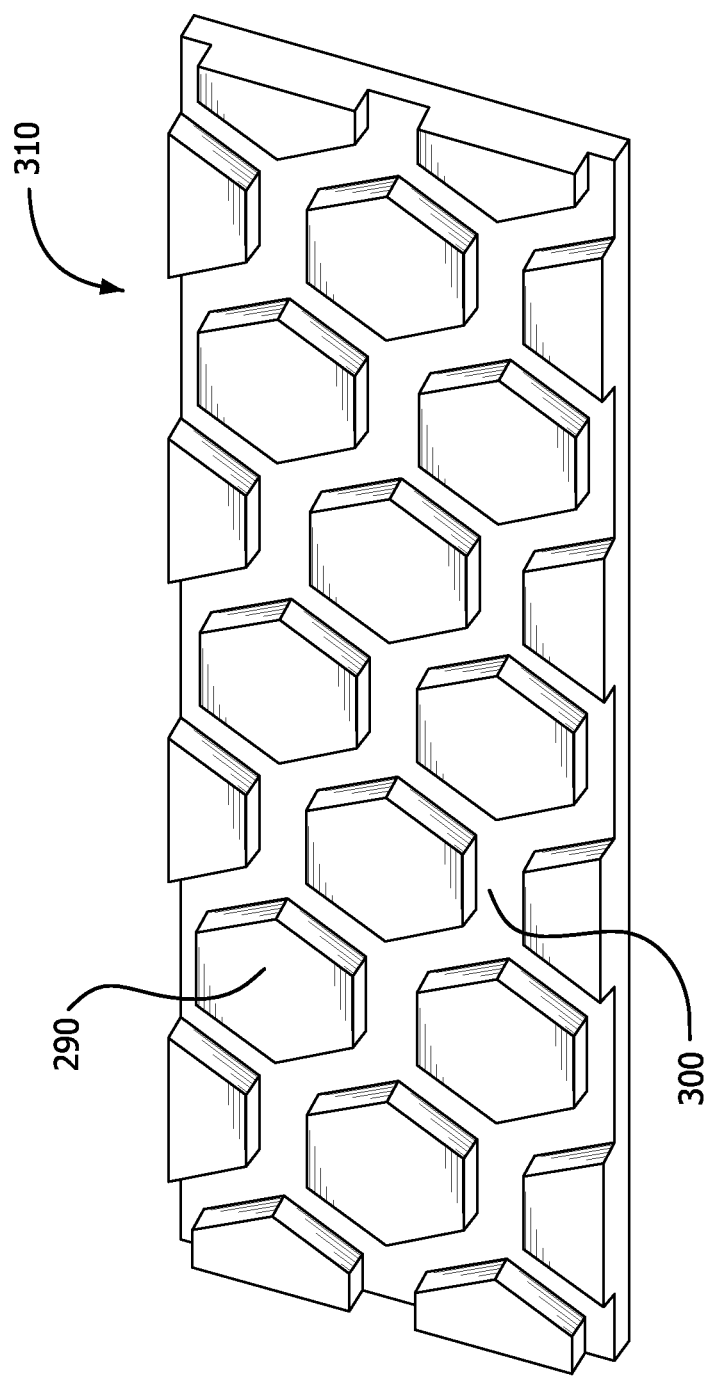
FIG. 14 is a schematic illustration of a portion of a patterned rubber roll consisting of raised hexagonal areas separated by channels according to one embodiment of the invention.
Figure 15:
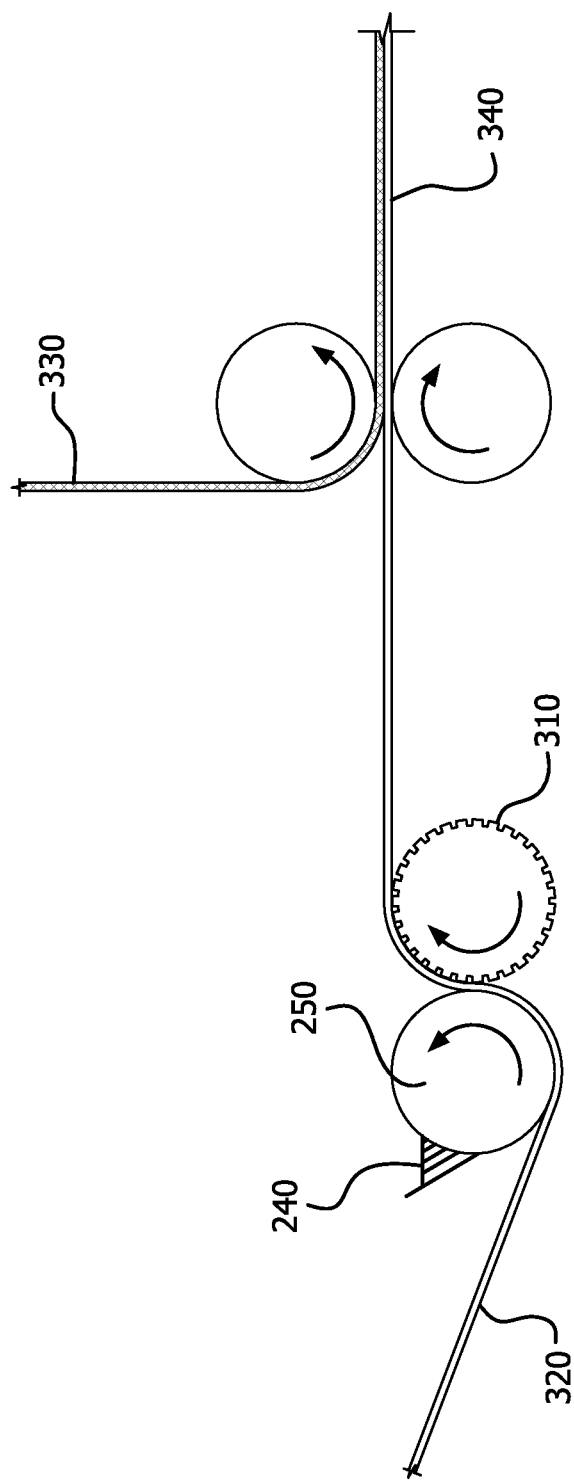
FIG. 15 is a schematic illustration of a process for forming a three-layered laminate according to another exemplary embodiment.

A patterned rubber roll consisting of raised hexagonal areas 290 10 mm wide separated by channels 300 4 mm wide and 2 mm deep was used to press the textile into a gravure roll. A portion of such a patterned rubber roll 310 is depicted in FIG. 14. A polyurethane adhesive 240 was obtained and loaded in the printer in order to apply heated adhesive dots to the textile 320 via roll 250, as shown in FIG. 15. 335 micron diameter dots were applied to the textile 320 at a percent area coverage of 53% primarily in the areas backed by the raised portions of the patterned rubber roll 310. An ePTFE/PU film 330 was tensioned and the PU side of the film was placed onto the adhesive side of the coated textile. While retaining the tension on the ePTFE/PU film 330, the resulting laminate 340 was spooled onto a roll (not illustrated) and allowed to moisture cure, which required approximately 2 days.

Following moisture curing, the laminate was unspooled and allowed to relax, thereby returning to the initial, untensioned state of the film. The hexagonal pattern was visible by the naked eye. The sample exhibited localized curling in the areas corresponding to the raised hexagonal areas of the patterned rubber roll. The concave surface of these areas was towards the film side of the laminate.

The width of the curled sections was 6.7 mm, the depth was 2.3 mm and the radius of curvature was 3.6 mm. The resulting laminate weighed 202 g/m². The water vapor transmission rate of the sample was 4,243 g/m²/24 h. The sample was liquid-proof and breathable. The thermal resistance per unit mass of the laminate was 0.204 (m²K/W)/(kg/m²). The thickness to weight per area ratio of the sample was 0.010 mm/(g/m²).

Example 4

A length of 137.7 g/m^2 nylon/elastane stretch woven material (Style Q4410 from Chia Her Industrial Co., Taipei, Taiwan) and a length of polyurethane-coated ePTFE were obtained. The ePTFE had the following properties: thickness=0.043 mm, density=0.41 g/cc, matrix tensile strength in the length direction=31×10⁶ MPa, matrix tensile strength in the width direction=93×10⁶ MPa, Bubble Point=1.5×10⁵ MPa. Polyurethane (PU) was applied by coating the ePTFE membrane and allowing it to at least partially penetrate the pores of the membrane, then cured.

A release paper 215 was laser cut using the honeycomb (hexagonal) pattern shown in FIG. 12. The hexagonal voids 220 were cut 10 mm wide and were separated by 4 mm wide strips of release paper 230. The release paper was positioned onto the ePTFE side of the coated membrane and the release paper plus membrane were fed into the gravure printer. In an alternative embodiment shown in FIG. 17, a gravure roll 315 having thereon the applied adhesive pattern (shown generally as 317 in FIG. 18) may transfer the adhesive to the functional film layer (e.g., coated membrane), thus eliminating the need for release paper 215. A portion of the gravure roll 325 is depicted in FIG. 18 and contains both the adhesive pattern 317 and non-adhesive areas 327.

Turning now to FIG. 13, a portion of the processing line for forming a two-layer laminate can be seen. Another polyurethane 240 was obtained and loaded in the printer in order to apply heated adhesive dots to the ePTFE side of the membrane via roll 250, 305 micron wide square adhesive dots were applied at a percent area coverage of 83% to the unmasked area of the ePTFE membrane 260. As used herein, the term "percent area coverage" of adhesive is meant to denote the total two-dimensional area of adhesive in a given region divided by the area of that region, multiplied by 100%. The stretch woven material was tensioned, the release paper 215 (mask) was removed, and the stretch woven textile 270 was placed onto the adhesive side of the membrane 260. While retaining the tension on the textile 270, the resulting laminate 280 was spooled onto a roll (not shown) and allowed to moisture cure, which required approximately 2 days.

Following moisture curing, the laminate was unspooled and allowed to relax, thereby returning to the initial, untensioned state of the textile. The hexagonal pattern was visible by the naked eye. The sample exhibited localized curling in the areas corresponding to the hexagonal voids in the release paper. The concave surface of these areas was towards the textile side of the laminate.

The width of the curled sections was 6.37 mm, the depth was 2.54 mm, and the radius of curvature was 3.27 mm. The resulting laminate weighed 194.5 g/m². The water vapor transmission rate of the sample was 4470 g/m²/24 h. The sample was liquid-proof and breathable. The thickness to weight per area ratio of the sample was 0.014 mm/(g/m²). The stretch force of the sample at 20% strain was 0.23 lbf. The stretch force of the raw stretch woven material at 20% strain was 0.73 lbf.

Comparative Example 1

A comparative prior art stretch material was assembled in the following manner and tested as described for coparison purposes. A length of 137.7 g/m^2 nylon/elastane stretch woven material (Style Q4410 from Chia Her Industrial Co., Taipei, Taiwan) and a length of polyurethane-coated ePTFE were obtained. The ePTFE had the following properties: thickness=0.043 mm, density=0.41 g/cc, matrix tensile strength in the length direction=31×10⁶ MPa, matrix tensile strength in the width direction=93×10⁶

MPa, Bubble Point=1.5×10⁵ MPa. Polyurethane (PU) was applied by coating the ePTFE membrane and allowing it to at least partially penetrate the pores of the membrane, then cured.

Turning now to FIG. 13, a portion of the processing line for forming a two-layer laminate can be seen. Another polyurethane 240 was obtained and loaded in the printer in order to apply heated adhesive dots to the ePTFE side of the membrane via roll 250. 500 micron diameter adhesive dots were applied at a percent area coverage of 40% to the ePTFE membrane 260. As used herein, the term "percent area coverage" of adhesive is meant to denote the total two-dimensional area of adhesive in a given region divided by the area of that region, multiplied by 100%. The stretch woven material 270 was tensioned and placed onto the adhesive side of the membrane 260. While retaining the tension on the textile 270, the resulting laminate 280 was spooled onto a roll (not shown) and allowed to moisture cure, which required approximately 2 days.

Following moisture curing, the laminate was unspooled and allowed to relax, thereby returning to the initial, untensioned state of the textile.

The resulting laminate weighed 164, 4 g/m². The water vapor transmission rate of the sample was 13540 g/m²/24 h. The sample was liquid-proof and breathable The thickness to weight per area ratio of the sample was 0.0035 mm/(g/m²). The stretch force of the sample at 20% strain was 5.25 lbf.

Example 5

A length of 49.0 g/m² nylon woven material (Style 131907 from Milliken, Spartanburg, S.C.) and a length of ePTFE membrane were obtained. The ePTFE had the following properties: thickness=0.043 mm, density=0.41 g/cc, matrix tensile strength in the length direction=31×10⁶ MPa, matrix tensile strength in the width direction=93×10⁶ MPa, Bubble Point=1.5×10⁵ MPa. The ePTFE membrane was laminated to a 25.4 micron thick, monolithic, thermoplastic polyurethane film (part number PT1710S from Deerfield Urethane, South Deerfield, Ma) using a continuous layer of breathable polyurethane adhesive applied at a coverage rate of 12 to 15 g/m². The breathable polyurethane adhesive was a moisture-cured polyether polyurethane adhesive, as described in U.S. Pat. No. 4,532,316 to Robert Henn.

A release paper 215 was laser cut using the honeycomb (hexagonal) pattern shown in FIG. 12. The hexagonal voids 220 were cut 10 mm wide and were separated by 4 mm wide strips of release paper 230. The release paper was positioned onto the woven material and the release paper plus woven material were fed into the gravure printer. In an alternative embodiment shown in FIG. 17, a gravure roll 315 having thereon the applied adhesive pattern (shown generally as 317 in FIG. 18) may transfer the adhesive to the woven material thus eliminating the need for release paper 215. A portion of the gravure roll 325 is depicted in FIG. 18 and contains both the adhesive pattern 317 and non-adhesive areas 327.

Turning now to FIG. 13, a portion of the processing line for forming a two-layer laminate can be seen. Another polyurethane 240 was obtained and loaded in the printer in order to apply heated adhesive dots to the woven material via roll 250. 305 micron wide square adhesive dots were applied at a percent area coverage of 83% to the unmasked area of the woven material 320. As used herein, the term "percent area coverage" of adhesive is meant to denote the total two-dimensional area of adhesive in a given region divided by the area of that region, multiplied by 100%. The ePTFE/polyurethane film was tensioned, the release paper 215 (mask) was removed, and the ePTFE/polyurethane film 330 was placed onto the adhesive side of the woven material 320. While retaining the tension on the ePTFE/polyurethane film 330, the resulting laminate 340 was spooled onto a roll (not shown) and allowed to moisture cure, which required approximately 2 days.

Following moisture curing, the laminate was unspooled and allowed to relax, thereby returning to the initial, untensioned state of the film. The hexagonal pattern was visible by the naked eye. The sample exhibited localized curling in the areas corresponding to the hexagonal voids in the release paper. The concave surface of these areas was towards the film side of the laminate.

The width of the curled sections was 6.07 mm, the depth was 2.88 mm and the radius of curvature was 3.04 mm. The resulting laminate weighed 247 g/m². The water vapor transmission rate of the sample was 3255 g/m²/24 h. The sample was liquid-proof and breathable. The thickness to weight per area ratio of the sample was 0.013 mm/(g/m²). The stretch force of the sample at 20% strain was 0.77 lbf. The stretch force of the raw ePTFE/polyurethane film at 20% strain was 6.63 lbf.

Comparative Example 2

A comparative prior art stretch material was assembled in the following manner and tested as described for coparison purposes. A length of 49.0 g/m² nylon woven material (Style 131907 from Milliken, Spartanburg, S.C.) and a length of ePTFE membrane were obtained. The ePTFE had the following properties: thickness=0.043 mm, density=0.41 g/cc, matrix tensile strength in the length direction=31×10⁶ MPa, matrix tensile strength in the width direction=93×10⁶ MPa, Bubble Point=1.5×10⁵

MPa. The ePTFE membrane was laminated to a 25.4 micron thick, monolithic, thermoplastic polyurethane film (part number PT1710S from Deerfield Urethane, South Deerfield, Ma) using a continuous layer of breathable polyurethane adhesive applied at a coverage rate of 12 to 15 g/m². The breathable polyurethane adhesive was a moisture-cured polyether polyurethane adhesive, as described in U.S. Pat. No. 4,532,316 to Robert Henn.

Turning now to FIG. 13, a portion of the processing line for forming a two-layer laminate can be seen. Another polyurethane 240 was obtained and loaded in the printer in order to apply heated adhesive dots to the woven material via roll 250. 390 micron wide square adhesive dots were applied at a percent area coverage of 15.5% to the unmasked area of the woven material 320. As used herein, the term "percent area coverage" of adhesive is meant to denote the total two-dimensional area of adhesive in a given region divided by the area of that region, multiplied by 100%. The ePTFE/polyurethane film 330 was tensioned and was placed onto the adhesive side of the woven material 320. While retaining the tension on the ePTFE/polyurethane film 330, the resulting laminate 340 was spooled onto a roll (not shown) and allowed to moisture cure, which required approximately 2 days.

Following moisture curing, the laminate was unspooled and allowed to relax, thereby returning to the initial, untensioned state of the film.

The resulting laminate weighed 149.2 g/m². The water vapor transmission rate of the sample was 6784 g/m²/24 h. The sample was liquid-proof and breathable. The thickness to weight per area ratio of the sample was 0.0036 mm/(g/m²). The stretch force of the sample at 20% strain was 6.39 lbf.

Example 6

A length of 79.4 g/m² polyester knit material (Style MT-O50 from Tah Tong

Textile Co., Taipei, Taiwan) and a length of polyurethane-coated ePTFE were obtained. The ePTFE had the following properties; thickness=0.043 mm, density=0.41 g/cc, matrix tensile strength in the length direction=31×10⁶ MPa, matrix tensile strength in the width direction=93×10⁶ MPa, Bubble Point=1.5×10⁵ MPa. Polyurethane (PU) was applied by coating the ePTFE membrane and allowing it to at least partially penetrate the pores of the membrane, then cured.

Figure 19:
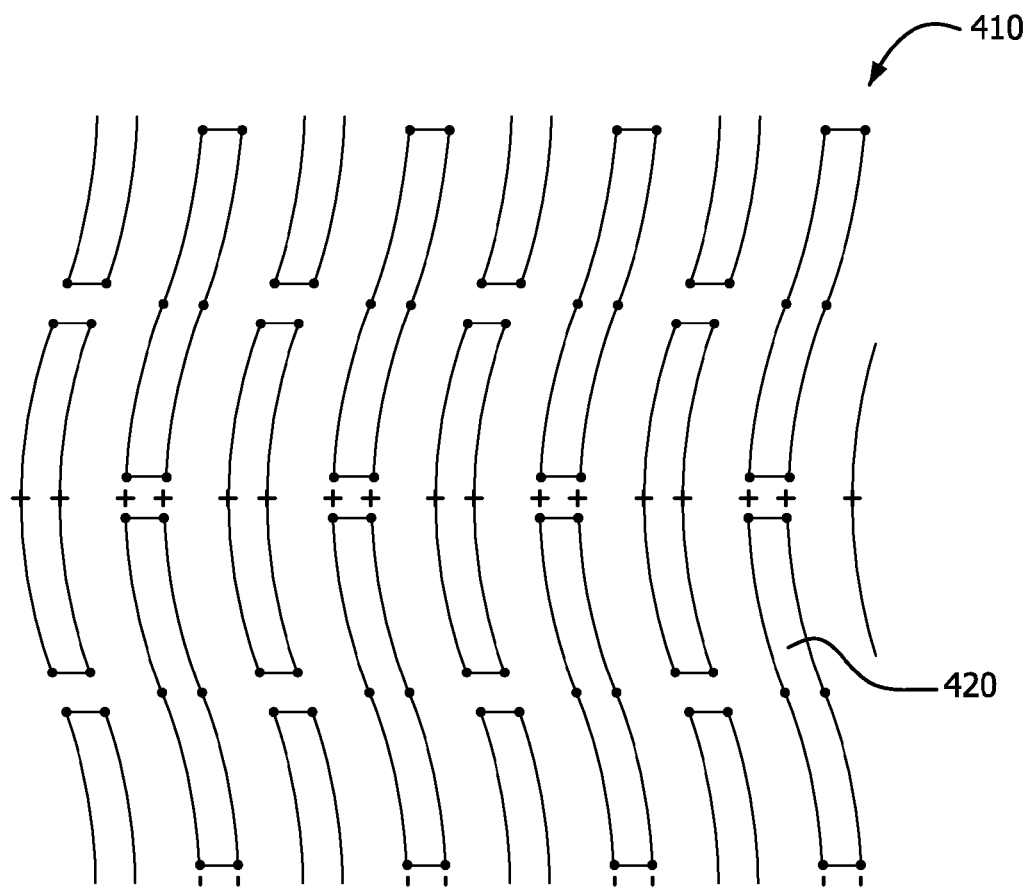
FIG. 19 is a schematic illustration of a release paper having therein a wavy parallel line pattern according to one exemplary embodiment of the invention.
Figure 20:
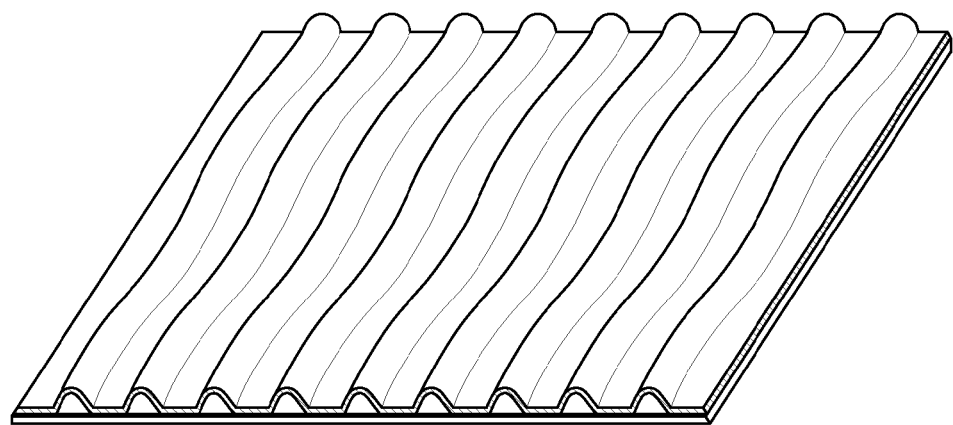
FIG. 20 is a schematic illustration of a laminate structure which exhibits bunching according to at least one exemplary embodiment of the invention.

A release paper 410 was laser cut using the pattern shown in FIG. 19. The dimension of the voids 420 was 3 mm wide by 27 mm in length and were separated by 5 mm wide strips of release paper 410. The release paper 410 was positioned onto the ePTFE side of the coated membrane and the release paper plus membrane were fed into the gravure printer.

Referring generally to FIG. 13, with the exception that the release paper 410, with the longer lengths of the voids 420 oriented in the machine direction, was substituted for release paper 215, a portion of the processing line for forming a two-layer laminate can be seen. Another polyurethane 240 was obtained and loaded in the printer in order to apply heated adhesive dots to the ePTFE side of the membrane via roll 250. Adhesive was applied to the unmasked area of the ePTFE membrane 260. The release paper 410 (mask) was removed, and the knit material 270 was placed onto the adhesive side of the membrane 260. While retaining the tension on the knit 270, the resulting laminate 280 was spooled onto a roll (not shown) and allowed to moisture cure, which required approximately 2 days.

Following moisture curing, the laminate was unspooled and allowed to relax, thereby returning to the initial, untensioned state of the textile. This reduction in tension allowed the knit to expand in the crossweb direction, i.e., the direction perpendicular in the plane of the textile to the knit rows of the knitted textile, which resulted in buckling and folding of the knit in the areas not corresponding to the voids in the release paper.

The resulting laminate weighed 298 g/m². The thickness to weight per area ratio of the sample was 0.0077 mm/(g/m²). The water vapor transmission rate of the sample was 6480 g/m²/24 h. The sample was liquid-proof and breathable.

The invention of this application has been described above both generically and with regard to specific embodiments. The invention is not otherwise limited, except for the recitation of the claims set forth below.

Having thus described the invention, what is claimed is:

1. A laminated article comprising,
    a functional film layer;
    a first textile; and
    a first adhesive layer bonding said functional film layer and said first textile, said first adhesive layer containing two or more adhesive regions separated by regions substantially free of adhesive, each said adhesive region containing a plurality of adhesive dots,
    wherein a distance between adjacent adhesive dots within said adhesive regions is less than a distance between consecutive adhesive regions,
    wherein said adhesive regions have at least one distinctive shape, wherein said laminate has a stretch force at 20% elongation of less than three times the stretch force of said first textile,
    wherein each said adhesive region induces a radius of curvature that forms raised portions in said laminated article that correspond to said regions substantially free of adhesive, and
    wherein said plurality of adhesive dots are distributed non-uniformly within said adhesive regions.

2. The laminated article of claim 1, wherein said laminate has a stretch force at 20% elongation of less than two times the stretch force of said first textile.

3. The laminated article of claim 1, wherein said laminate has a stretch force at 20% elongation of less than the stretch force of said first textile.

4. The laminated article of claim 1, wherein said laminate has a stretch force at 20% elongation of less than 0.5 times the stretch force of said first textile.

5. The laminated article of claim 1, wherein said laminate has a stretch force at 20% elongation of less than 0.33 times the stretch force of said first textile.

6. The laminated article of claim 1, wherein said laminate has a stretch force at 20% elongation of less than 0.16 times the stretch force of said first textile.

7. The laminated article of claim 1, wherein said functional film layer is a fluoropolymer.

8. The laminated article of claim 1, wherein said functional film layer is selected from expanded polytetrafluoroethylene (ePTFE), expanded modified polytetrafluoroethylene, polytetrafluoroethylene (PTFE), ePTFE coated with a protective coating, PTFE coated with a protective coating, polyurethane and combinations thereof.

9. The laminated article of claim 1, wherein said functional film layer is waterproof and breathable.

10. The laminated article of claim 1, wherein said plurality of adhesive dots each have substantially the same size.

11. The laminated article of claim 1, wherein said adhesive dots differ in size within said adhesive regions.

12. The laminated article of claim 1, wherein adhesive dots positioned on an outer portion of said adhesive regions have a diameter that is larger than adhesive dots positioned on an inner portion of said adhesive regions.

13. A garment comprising the laminated article of claim 1.

14. The laminated article of claim 1, wherein said radius of curvature is greater than about 1 mm.

15. The laminated article of claim 1, wherein said laminate preferentially bends in said regions substantially free of adhesive.

16. The laminated article of claim 1, wherein a least one of the first textile and the adhesive regions comprises a fire retardant or fire resistant material.

17. A laminated article comprising:
    a functional film layer;
    a first textile; and
    a first adhesive layer bonding said functional film layer and said first textile, said first adhesive layer containing adhesive regions and regions substantially free of adhesive, wherein said regions substantially free of adhesive are interspaced between said adhesive regions,
    wherein said laminate has a stretch force at 20% elongation of less than three times the stretch force of said first textile,
    wherein each said adhesive region induces a radius of curvature that forms raised portions in said laminated article that correspond to said regions substantially free of adhesive, and
    wherein at least one of said first adhesive regions comprise a substantially continuous band of adhesive surrounding a plurality of adhesive dots.

18. The laminated article of claim 17, wherein said laminate has a stretch force at 20% elongation of less than two times the stretch force of said first textile.

19. The laminated article of claim 17, wherein said laminate has a stretch force at 20% elongation of less than the stretch force of said first textile.

20. The laminated article of claim 17, wherein said laminate has a stretch force at 20% elongation of less than 0.5 times the stretch force of said first textile.

21. The laminated article of claim 17, wherein said laminate has a stretch force at 20% elongation of less than 0.33 times the stretch force of said first textile.

22. The laminated article of claim 17, wherein said laminate has a stretch force at 20% elongation of less than 0.16 times the stretch force of said first textile.

23. The laminated article of claim 17, wherein said laminated article preferentially bends in said regions substantially free of adhesive.

24. The laminated article of claim 17, wherein said regions substantially free of adhesive have a width greater than about 2 mm.

25. The laminated article of claim 17, wherein said functional film layer is a fluoropolymer.

26. The laminated article of claim 17, wherein said functional film layer is selected from expanded polytetrafluoroethylene (ePTFE), expanded modified polytetrafluoroethylene, polytetrafluoroethylene (PTFE), ePTFE coated with a protective coating, PTFE coated with a protective coating, polyurethane and combinations thereof.

27. The laminated article of claim 17, wherein said plurality of adhesive dots have substantially the same size.

28. The laminated article of claim 17, wherein said plurality of adhesive dots differ in size.

29. The laminated article of claim 17, wherein said functional film layer is waterproof and breathable.

30. A garment comprising the laminated article of claim 17.

31. The laminated article of claim 14, wherein said radius of curvature is greater than about 1 mm.

32. The laminated article of claim 17, wherein said laminate preferentially bends in said regions substantially free of adhesive.

33. The laminated article of claim 17, wherein a least one of the first textile and the adhesive regions comprises a fire retardant or fire resistant material.

34. A laminated article comprising:
a functional film layer;
a first textile; and
a first adhesive layer bonding said functional film layer and said first textile, said first adhesive layer containing adhesive regions and regions substantially free of adhesive,
wherein said regions substantially free of adhesive are interspaced between said adhesive regions,
wherein the distribution of adhesive within said adhesive regions is non-uniform, and
wherein each said adhesive region induces a radius of curvature that forms raised portions in said laminated article that correspond to said regions substantially free of adhesive.

35. The laminated article of claim 34, wherein said regions substantially free of adhesive have a width greater than about 2 mm.

36. A garment comprising the laminated article of claim 34.

37. The laminated article of claim 34, wherein said radius of curvature is greater than about 1 mm.

38. The laminated article of claim 34, wherein said laminate preferentially bends in said regions substantially free of adhesive.

39. The laminated article of claim 34, wherein a least one of the first textile and the adhesive regions comprises a fire retardant or fire resistant material.

40. A laminated article comprising:
a functional film layer;
a first textile; and
a first adhesive layer bonding said functional film layer and said first textile, said first adhesive layer containing first adhesive regions and second adhesive regions,
wherein said first adhesive regions contain an amount of adhesive that is greater than an amount of adhesive present in said second adhesive regions, and
wherein said laminate has a stretch force at 20% elongation of less than three times the stretch force of said functional film layer.

41. The laminated article of claim 40, wherein said laminate has a stretch force at 20% elongation of less than two times the stretch force of said functional film layer.

42. The laminated article of claim 40, wherein said laminate has a stretch force at 20% elongation of less than the stretch force of said functional film layer.

43. The laminated article of claim 40, wherein said laminate has a stretch force at 20% elongation of less than 0.5 times the stretch force of said functional film layer.

44. The laminated article of claim 40, wherein said laminate has a stretch force at 20% elongation of less than 0.33 times the stretch force of said functional film layer.

45. The laminated article of claim 40, wherein said laminate has a stretch force at 20% elongation of less than 0.16 times the stretch force of said functional film layer.

46. The laminated article of claim 40, wherein said laminate has a stretch force at 20% elongation of less than three times the stretch force of said functional film layer.

47. The laminated article of claim 40, wherein said radius of curvature is greater than about 1 mm.

48. The laminated article of claim 40, wherein said laminate preferentially bends in said second adhesive regions.

49. The laminated article of claim 40, wherein at least one of the first textile and the first adhesive regions comprises a fire retardant or fire resistant material.

50. A laminated article comprising:
a functional film layer;
a first textile: and
a first adhesive layer bonding said functional film layer and said first textile, said first adhesive layer containing two or more adhesive regions separated by regions substantially free of adhesive, each said adhesive region containing a plurality of adhesive dots,
wherein a distance between adjacent adhesive dots within said adhesive regions is less than a distance between consecutive adhesive regions,
wherein said adhesive regions have at least one distinctive shape,
wherein said laminate has a stretch force at 20% elongation of less than three times the stretch force of said first textile,
wherein each said adhesive region induces a radius of curvature that forms raised portions in said laminated article that correspond to said regions substantially free of adhesive, and
wherein said plurality of adhesive dots each have substantially the same size.

51. A laminated article comprising:
a functional film layer;
a first textile; and
a first adhesive layer bonding said functional film layer and said first textile, said first adhesive layer containing two or more adhesive regions separated by regions substantially free of adhesive, each said adhesive region containing a plurality of adhesive dots,
wherein a distance between adjacent adhesive dots within said adhesive regions is less than a distance between consecutive adhesive regions,
wherein said adhesive regions have at least one distinctive shape,
wherein said laminate has a stretch force at 20% elongation of less than three times the stretch force of said first textile, wherein each said adhesive region induces a radius of curvature that forms raised portions in said laminated article that correspond to said regions substantially free of adhesive, and wherein said adhesive dots differ in size within said adhesive regions.

52. A laminated article comprising:
a functional film layer;
a first textile; and
a first adhesive layer bonding said functional film layer and said first textile, said first adhesive layer containing two or more adhesive regions separated by regions substantially free of adhesive, each said adhesive region containing a plurality of adhesive dots, wherein a distance between adjacent adhesive dots within said adhesive regions is less than a distance between consecutive adhesive regions, wherein said adhesive regions have at least one distinctive shape, wherein said laminate has a stretch force at 20% elongation of less than three times the stretch force of said first textile, wherein each said adhesive region induces a radius of curvature that forms raised portions in said laminated article that correspond to said regions substantially free of adhesive, and wherein adhesive dots positioned on an outer portion of said adhesive regions have a diameter that is larger than adhesive dots positioned on an inner portion of said adhesive regions.

53. A laminated article comprising:
a functional film layer;
a first textile; and
a first adhesive layer bonding said functional film layer and said first textile, said first adhesive layer containing adhesive regions and regions substantially free of adhesive, wherein said regions substantially free of adhesive are interspaced between said adhesive regions, wherein said laminate has a stretch force at 20% elongation of less than three times the stretch force of said first textile, wherein each said adhesive region induces a radius of curvature that forms raised portions in said laminated article that correspond to said regions substantially free of adhesive, and wherein at least one of said first adhesive regions comprise strips of adhesive positioned within the adhesive region such that the strips of adhesive are substantially parallel to each other with said regions substantially free of adhesive interspacing said strips of adhesive.

54. A laminated article comprising:
a functional film layer;
a first textile; and
a first adhesive layer bonding said functional film layer and said first textile, said first adhesive layer containing adhesive regions and regions substantially free of adhesive, wherein said regions substantially free of adhesive are interspaced between said adhesive regions, wherein said laminate has a stretch force at 20% elongation of less than three times the stretch force of said first textile, wherein each said adhesive region induces a radius of curvature that forms raised portions in said laminated article that correspond to said regions substantially free of adhesive, and wherein at least one of said first adhesive regions comprises centrally located regions that are free or substantially free of adhesive.

55. A laminated article comprising:
a functional film layer:
a first textile; and
a first adhesive layer bonding said functional film layer and said first textile, said first adhesive layer containing adhesive regions and regions substantially free of adhesive, wherein said regions substantially free of adhesive are interspaced between said adhesive regions, wherein the distribution of adhesive within said adhesive regions is non-uniform, and wherein said regions substantially free of adhesive have a first bending modulus that is lower than a second bending modulus of said adhesive regions.

56. A laminated article comprising:
a functional film layer;
a first textile; and
a first adhesive layer bonding said functional film layer and said first textile, said first adhesive layer containing two or more adhesive regions separated by regions substantially free of adhesive, each said adhesive region containing a plurality of adhesive dots, wherein a distance between adjacent adhesive dots within said adhesive regions is less than a distance between consecutive adhesive regions, wherein said adhesive regions have at least one distinctive shape, wherein said laminate has a stretch force at 20% elongation of less than three times the stretch force of said first textile, and wherein said regions substantially free of adhesive have a first bending modulus that is lower than a second bending modulus of said adhesive regions and said laminate preferentially bends in said second adhesive regions.

57. A laminated article comprising;
a functional film layer;
a first textile; and
a first adhesive layer bonding said functional film layer and said first textile, said first adhesive layer containing first adhesive regions and second adhesive regions, wherein said first adhesive regions contain an amount of adhesive that is greater than an amount of adhesive present in said second adhesive regions, and wherein said second adhesive regions have a first bending modulus that is lower than a second bending modulus in said first adhesive regions and said laminate preferentially bends in said second adhesive regions.

* * * * *

UNITED STATES PATENT AND TRADEMARK OFFICE
CERTIFICATE OF CORRECTION

| | | |
|---|---|---|
| PATENT NO. | : 9,233,520 B2 | Page 1 of 1 |
| APPLICATION NO. | : 13/851761 | |
| DATED | : January 12, 2016 | |
| INVENTOR(S) | : William Kelsey | |

It is certified that error appears in the above-identified patent and that said Letters Patent is hereby corrected as shown below:

In the claims,

Column 25, line 23, Claim 31: change "claim 14" to --claim 17--

Signed and Sealed this
Third Day of May, 2016

Michelle K. Lee
*Director of the United States Patent and Trademark Office*